(12) United States Patent
Nakamaru

(10) Patent No.: US 7,995,852 B2
(45) Date of Patent: Aug. 9, 2011

(54) IMAGING DEVICE AND IMAGING METHOD

(75) Inventor: Fumio Nakamaru, Asaka (JP)

(73) Assignee: Fujifilm Corporation, Tokyo (JP)

( * ) Notice: Subject to any disclaimer, the term of this patent is extended or adjusted under 35 U.S.C. 154(b) by 1046 days.

(21) Appl. No.: 11/285,047

(22) Filed: Nov. 23, 2005

(65) Prior Publication Data

US 2006/0115297 A1    Jun. 1, 2006

(30) Foreign Application Priority Data

Nov. 29, 2004  (JP) ................................ 2004-344553

(51) Int. Cl.
G06K 9/40       (2006.01)
H04N 5/225      (2006.01)
H04N 5/228      (2006.01)

(52) U.S. Cl. ................. 382/255; 348/207.99; 348/208.6

(58) Field of Classification Search .......... 382/254–255; 396/153; 348/207.99, 208.99
See application file for complete search history.

(56) References Cited

U.S. PATENT DOCUMENTS

| | | | | |
|---|---|---|---|---|
| 5,172,226 A | * | 12/1992 | Morimura et al. | 348/207.99 |
| 5,237,405 A | * | 8/1993 | Egusa et al. | 348/208.1 |
| 5,737,643 A | * | 4/1998 | Kitagawa et al. | 396/55 |
| 6,148,108 A | | 11/2000 | Nishikawa | |
| 6,573,930 B2 | * | 6/2003 | Kyuma et al. | 348/208.5 |
| 7,010,045 B2 | * | 3/2006 | Lee | 375/240.25 |
| 7,221,390 B1 | * | 5/2007 | Kutka | 348/208.4 |
| 7,333,132 B2 | * | 2/2008 | Shimizu et al. | 348/208.1 |
| 2005/0104971 A1 | * | 5/2005 | Pilu | 348/208.99 |

FOREIGN PATENT DOCUMENTS

| | | | |
|---|---|---|---|
| JP | 4-180370 A | | 6/1992 |
| JP | 5-022645 A | | 1/1993 |
| JP | 5-110912 A | | 4/1993 |
| JP | 5-164955 A | | 6/1993 |
| JP | 2000-115631 A | | 4/2000 |
| JP | 2000-358187 A | | 12/2000 |
| JP | 2001-045340 A | | 2/2001 |
| JP | 2001-223932 A | | 8/2001 |
| JP | 2002-44601 A | | 2/2002 |
| JP | 2002-214659 A | | 7/2002 |
| JP | 2002-247444 | * | 8/2002 |
| JP | 2002-247444 A | | 8/2002 |
| JP | 2003-134385 A | | 5/2003 |
| JP | 2004-120576 A | | 4/2004 |

* cited by examiner

*Primary Examiner* — Vu Le
*Assistant Examiner* — Andrae S Allison
(74) *Attorney, Agent, or Firm* — Birch, Stewart, Kolasch & Birch, LLP

(57) ABSTRACT

An imaging device, comprising:
  an image pickup device which images a subject; and
  a motion estimating device which estimates a motion of the subject and a motion of the imaging device based on a dynamic image or a plurality of still images which are imaged to include the subject prior to actual imaging of a still image of the subject by the image pickup device.

21 Claims, 25 Drawing Sheets

IMAGING DEVICE AND IMAGING METHOD

BACKGROUND OF THE INVENTION

1. Field of the Invention

The present invention relates to an imaging device and an imaging method, and more particularly to an imaging device and imaging method that can prevent deterioration in the image quality of a still image captured in actual imaging that is caused by motion of the subject or motion of the imaging device.

2. Description of the Related Art

In general, when imaging a subject in a state in which the subject is moving or the camera is moving, so-called subject blur or camera blur (also called camera shake) occurs within the image and deteriorates the image quality.

Consequently, imaging devices have been proposed which have various measures taken to prevent blurs from occurring in images.

Japanese Patent Application Laid-Open No. 2001-045340 discloses a device that by comparing imaging environment characteristics such as focus distance characteristics, exposure characteristics and color characteristics prior to actual imaging with those at the time of actual imaging, determines the deterioration in image quality caused by some reason such as an unforeseen change in light source, camera shake or subject movement and generates a warning.

Japanese Patent Application Laid-Open No. 2002-214659 discloses a device which has a mechanical sensor that detects the angular acceleration in the yaw direction and pitch direction with respect to the optical axial direction of the camera, a first area sensor which receives light of the subject image, and a second area sensor which takes an image of the eye of the photographer that is looking at the view-finder. The device determines the state of the camera in accordance with the output of each sensor, and corrects blurs in accordance with the determined results.

Japanese Patent Application Laid-Open No. 2003-134385 discloses a device which, when obtaining a wide image of a dynamic range by synthesizing two images of different exposures, determines whether a difference that arose between the two captured images of different exposures is due to either subject movement or camera shake and then conducts image synthesis.

Japanese Patent Application Laid-Open No. 5-022645 discloses a device that detects respective motion vectors from the display periphery and the display center to detect motion of the display overall (i.e. camera shake) that excludes motion of the subject.

Japanese Patent Application Laid-Open No. 10-210473 discloses a device that extracts a characterizing portion of the principal subject from the original image to detect a motion vector.

Japanese Patent Application Laid-Open No. 2000-358187 discloses a device that performs blur correction on a CCD (Charge Coupled Device) and on a memory.

Japanese Patent Application Laid-Open No. 2002-247444 discloses a device that has a camera shake detection sensor (camera shake detection part) which detects camera shake to correct camera blur in images.

SUMMARY OF THE INVENTION

However, the conventional devices were not designed to estimate both the motion of the subject and the motion of the imaging device on the basis of a still image of the subject captured before actual imaging.

Although the device disclosed in Japanese Patent Application Laid-Open No. 2001-045340 can detect that the quality of an image was actually degraded due to some reason, it cannot perform the detection until after the actual imaging. Further, the device cannot determine whether the degradation in image quality is caused by camera shake or subject movement.

The device disclosed in Japanese Patent Application Laid-Open No. 2002-214659 cannot exert an effect unless it is an imaging device which is equipped with a mechanical sensor (for example, a gyro) as a camera blur detection device and an area sensor (a so-called line-of-sight position detecting sensor) as a line-of-sight position detection device. More specifically, in addition to camera shake and subject movement, there is also movement which the photographer intentionally performs such as panning, and thus in order for the imaging device to determine which kind of movement is occurring a gyro or line-of-sight position detecting sensor or the like is necessary.

Further, while the device disclosed in Japanese Patent Application Laid-Open No. 2003-134385 is designed to perform appropriate image synthesis after imaging two images that had different exposures at the time of actual imaging on the basis of the difference between the two images, it is not designed to estimate the motion of the subject or the imaging device prior to actually imaging a still image of the subject.

Although the device disclosed in Japanese Patent Application Laid-Open No. 05-022645 enables the detection of camera shake, it cannot overcome the problem of subject movement.

Further, there is no description in Japanese Patent Application Laid-Open No. 5-022645 that suggests estimating the motion of the subject or imaging device prior to actually imaging a still image of the subject.

Although the device disclosed in Japanese Patent Application Laid-Open No. 10-210473 detects a motion vector by comparison with an image pattern, it requires a pattern which extracts the characteristics of the main subject.

Further, since the devices disclosed in Japanese Patent Application Laid-Open No. 2000-358187 and Japanese Patent Application Laid-Open No. 2002-247444 only predict the overall motion vector, they can only perform one correction processing for an overall image. Further, these devices cannot detect a separate motion vector for the main subject.

These conventional devices are not suitable for predicting the motion of the subject or motion of the imaging device to prevent deterioration in the quality of the actually imaged still image that is caused by motion of the subject or motion of the imaging device, without using special hardware such as a gyro.

The present invention was made in view of the foregoing circumstances, and it is an object of the present invention to provide an imaging device and imaging method that can prevent deterioration in the quality of the actually imaged still image which is caused by motion of a subject or motion of the imaging device by predicting the motion of a subject or motion of the imaging device without using special hardware such as a gyro.

In order to achieve the above object, the first aspect of the present invention comprises an image pickup device which images a subject, and a motion estimating device which estimates a motion of the subject and a motion of the imaging device based on a dynamic image or a plurality of still images which are imaged to include the subject prior to actual imaging of a still image of the subject by the image pickup device.

According to this configuration, since the motion of the subject and motion of the imaging device are estimated on the basis of a plurality of still images or a dynamic image that are imaged to include the subject prior to actual imaging of a still image without using special hardware such as a gyro, it is possible to prevent deterioration in the quality of a still image imaged at the actual imaging which is caused by a motion of the subject or motion of the imaging device.

The second aspect of the present invention is configured in accordance with the first aspect, wherein the image pickup device performs imaging of a through image prior to actual imaging of a still image of the subject, and the motion estimating device estimates the motion of the subject and motion of the imaging device based on a plurality of still images which were extracted at predetermined time intervals from the through image.

The third aspect of the present invention is configured in accordance with the first aspect, wherein the image pickup device performs pre-imaging a plurality of times at predetermined intervals prior to actual imaging of a still image of the subject, and the motion estimating device estimates the motion of the subject and the motion of the imaging device based on a plurality of still images which were obtained by the pre-imaging.

The fourth aspect of the present invention is configured in accordance with the first aspect, wherein the image pickup device performs continuous imaging which images successive still images of the subject at predetermined intervals, and during the continuous imaging, the motion estimating device estimates the motion of the subject and the motion of the imaging device at the time of the next imaging of a still image on the basis of a plurality of still images which were already captured.

The fifth aspect of the present invention is configured in accordance with any one of the first to fourth aspects, further comprising an imaging conditions setting device which sets shutter speed, diaphragm, sensitivity, light emission conditions and other imaging conditions based on the motion of the subject and the motion of the imaging device which were estimated by the motion estimating device.

According to this configuration, the setting of imaging conditions is simplified and subject blur and camera blur are prevented in accordance with the estimated motion of the subject and motion of the camera at the time of actual imaging.

The sixth aspect of the present invention is configured in accordance with the fifth aspect, wherein the imaging conditions setting device sets the imaging conditions after taking into account whether or not continuous imaging is being performed.

The seventh aspect of the present invention is configured in accordance with the fifth or sixth aspect, wherein the imaging conditions setting device sets the imaging conditions after assigning weights to a motion vector of the subject and a motion vector of the imaging device, respectively.

The eighth aspect of the present invention is configured in accordance with any one of the first to seventh aspects, further comprising a blur prevention control device which imparts a physical movement to the image pickup device so as to prevent a blur occurring in a still image that is actually imaged, based on the motion of the subject and motion of the imaging device which were estimated by the motion estimating device.

According to this configuration, subject blur and camera blur are prevented in accordance with the predicted subject motion and camera motion at the time of actual imaging.

The ninth aspect of the present invention is configured in accordance with the eighth aspect, wherein the blur prevention control device imparts a physical movement to the image pickup device after taking into account whether or not continuous imaging is being performed.

The tenth aspect of the present invention is configured in accordance with the eighth or ninth aspect, wherein the blur prevention control device imparts a physical movement to the image pickup device after assigning weights to a motion vector of the subject and a motion vector of the imaging device, respectively.

The eleventh aspect of the present invention is configured in accordance with any one of the first to tenth aspects, further comprising an image correction device which corrects a still image that was actually imaged by the image pickup device, based on the motion of the subject and motion of the imaging device.

According to this configuration, it is possible to output an image in which a blur was corrected even in a case in which a blur occurred in the image.

The twelfth aspect of the present invention is configured in accordance with the eleventh aspect, wherein the image correction device corrects the still image that was the actually imaged after taking into account whether or not continuous imaging is being performed.

The thirteenth aspect of the present invention is configured in accordance with the eleventh or twelfth aspect, wherein the image correction device corrects the still image that was actually imaged after assigning weights to a motion vector of the subject and a motion vector of the imaging device, respectively.

The fourteenth aspect of the present invention is configured in accordance with any one of the eleventh to thirteenth aspects, further comprising a display device that is capable of displaying one or a plurality of still images that were corrected by the image correction device and also displaying a still image in a state before it was corrected by the image correction device.

According to this configuration the correction effects can be easily notified to a user and the user can select a preferred image.

The fifteenth aspect of the present invention is configured in accordance with the fourteenth aspect, wherein a ratio of the sizes of the still image after correction and the still image before correction or a ratio of the sizes of two or more the still images after correction is variable.

The sixteenth aspect of the present invention is configured in accordance with the fourteenth or fifteenth aspect, wherein the screen size of the display device can be changed according to whether or not to display both the still image after correction and the still image before correction simultaneously, or according to the number of the still images after correction that are displayed simultaneously.

The seventeenth aspect of the present invention is configured in accordance with any one of the fourteenth to sixteenth aspects, further comprising an instruction input device which inputs a selection instruction that specifies a still image to be recorded on a predetermined recording medium from among the still image after correction and the still image before correction, or a selection instruction that specifies a still image to be recorded on the recording medium from among a plurality of the still images after correction, and an image recording control device that records a still image that was selected in accordance with the selection instruction.

According to this configuration unwanted images can be eliminated without being recorded.

The eighteenth aspect of the present invention is configured in accordance with the seventeenth aspect, wherein, when a plurality of still images was selected by the instruction input device, the image recording control device associates the selected still images with one another before conducting the recording.

According to this configuration, since a plurality of still images that were selected are associated together, imaging mistakes can be effectively decreased.

The nineteenth aspect of the present invention is configured in accordance with the seventeenth or eighteenth aspect, wherein in a case of continuous imaging the image recording control device records both the still image before correction and the still image after correction without waiting for input of the selection instruction, while in a case of single image imaging the image recording control device waits for input of the selection instruction before conducting the recording.

According to this configuration, since in the case of continuous imaging both a still image before correction and a still image after correction are recorded without waiting for input of a selection instruction and in the case of imaging a single image the recording is performed after waiting for the input of a selection instruction, it is possible to arbitrarily perform continuous imaging that does not wait for input of an image selection instruction and imaging of a single image that waits for input of a image selection instruction, thus enhancing the operability of the device.

The twentieth aspect of the present invention is an imaging method that uses an imaging device which images a subject, wherein a motion of the subject and a motion of the imaging device is estimated on the basis of a dynamic image or a plurality of still images that are imaged to include the subject, and thereafter actual imaging of a still image of the subject is performed.

According to the present invention, it is possible to prevent deterioration in the quality of a still image that was actually imaging which is caused by motion of a subject or motion of the imaging device by estimating the motion of the subject or motion of the imaging device without using special hardware such as a gyro.

DETAILED DESCRIPTION OF THE PREFERRED EMBODIMENTS

Hereunder, preferred embodiments for implementing the present invention are described in detail with the aid of the attached drawings.

Figure 1:
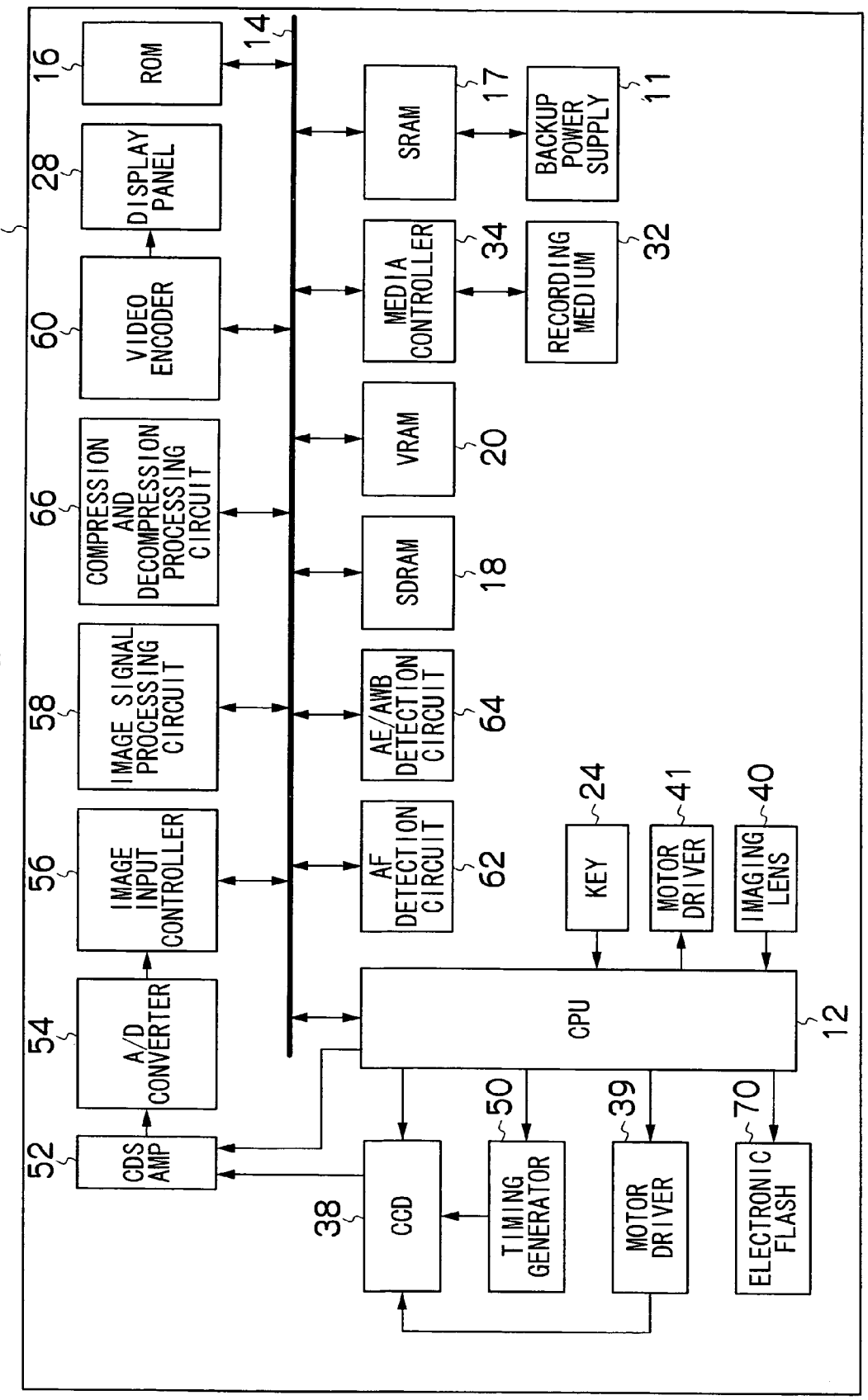
FIG. 1 is a block diagram showing an example of a camera as one embodiment of the imaging device of the present invention.

FIG. 1 is a block diagram showing the specific overall configuration of a camera 10 as one embodiment of the imaging device of the present invention.

Centralized control of the camera 10 is performed by a central processing unit (CPU) 12. More specifically, the CPU 12 performs motion estimating processing that estimates the motion of the main subject and the camera 10, imaging conditions setting processing that sets imaging conditions for the camera 10, image correction processing that corrects images that were imaged, image display control processing that controls the display of imaged images, image recording control processing that controls recording of imaged images, as well as other kinds of control processing. A detailed description of these types of control processing is given below.

A ROM 16 that was connected to the CPU 12 through a bus 14 is a memory that stores programs executed by the CPU 12 and various kinds of fixed data that are required for operation of the programs. A backup memory (SRAM) 17 is a non-volatile memory whose memory is maintained by a backup power supply 11. A main memory (SDRAM) 18 is a memory which is utilized as a region for various kinds of control processing carried out by the CPU 12 and also as a region for temporarily storing image data obtained by imaging. A VRAM 20 is a memory which temporarily stores image data for image display.

The camera 10 is equipped with various instruction input keys 24 such as a mode selection key, a through image display key, a release key, a menu key, an OK key, cross keys and a cancel key. Signals from these various keys 24 are input into the CPU 12, and the CPU 12 controls each part of the camera 10 based on the input signals. The mode selection key is a key for switching between an imaging mode for recording image data obtained by imaging a subject on a predetermined recording medium 32 and a playback mode for playing back image data that was recorded on the recording medium 32. The mode selection key is also a key for switching between whether or not to perform continuous imaging which captures successive still images of a subject at predetermined time intervals. The through image display key is a key for inputting an instruction to display a through image obtained by continuous imaging of a subject prior to actual imaging of a still image. The release key is a key for inputting an imaging preparation instruction and instruction to start imaging, and it is a two-stage stroke key having an S1 switch which turns on when the key is half pressed and an S2 switch which turns on when the key is fully pressed. The menu key is a key for displaying the menu screen. The cross keys, OK key and cancel key are used to select an item in the menu screen or to select an image.

A display panel 28 comprises a liquid crystal display (LCD) that can display images. The display panel 28 can also be used as an electronic viewfinder for confirming the angle of view by displaying a through image and as a device which plays back and displays recorded still images.

Next, components of the camera 10 which relate to imaging will be described.

When the imaging mode is selected by the mode selection key, power is supplied to a part (imaging part) relating to imaging which includes a CCD 38.

An imaging lens 40 is an optical unit which includes a zoom lens, a focus lens and an iris that is a mechanical shutter that also serves as a diaphragm. Zoom control, focus control and iris control (diaphragm control and mechanical shutter control) are performed by electrically driving the zoom lens, focus lens and iris by means of a motor driver 41 for driving the imaging lens 40.

Light that passed through the imaging lens 40 forms an image on an image plane of the CCD 38. A large number of photodiodes (light receiving elements) are two-dimensionally disposed on the image plane of the CCD 38, and primary color filters of red (R), green (G) and blue (B) are disposed in a predetermined array configuration in correspondence to each photodiode. The CCD 38 also has a so-called electronic shutter function that controls the charge storage time (shutter speed). The CPU 12 controls the charge storage time in the CCD 38 through a timing generator 50. A subject image that was formed on the image plane of the CCD 38 is converted to a signal charge of an amount that corresponds with the amount of incident light by each photodiode. The signal charges that were accumulated by each photodiode are read out sequentially as voltage signals (separate image signals for each of colors R, G and B) that correspond to the signal charges based on a driving pulse imparted from the timing generator 50 in accordance with an instruction from the CPU 12.

The separate image signals for each of the colors R, G and B that were acquired from the CCD 38 are sent to an analog processing part (CDS/AMP circuit) 52 to be subjected to a sample-and-hold action (correlated double sampling processing) for each pixel, and then amplified and sent to an A/D converter 54 to be converted from analog to digital signals. Image signals that were output from the A/D converter 54 are temporarily stored in the main memory 18 through an image input controller 56. In accordance with an instruction from the CPU 12, an image signal processing circuit 58 processes the separate image signals for each of the colors R, G and B that were stored in the main memory 18. More specifically, the image signal processing circuit 58 functions as an image signal processing device which includes a synchronization circuit (a circuit which corrects spatial deviations in the R, G and B signals which accompany the color filter arrays of the CCD 38 to convert the image signals into a synchronous system), a white balance correction circuit, a gamma correction circuit and a YC signal generating circuit. Image data that underwent image processing by the image signal processing circuit 58 is stored in a VRAM 20.

Next, a description is given regarding a through image, which refers to image data that was stored on the VRAM 20 being displayed on the display panel 28 in a direct manner without being recorded on the recording medium 32. When through image display is selected by use of the through image display key, image data is read from the VRAM 20 and sent to a video encoder 60 through the bus 14. The video encoder 60 converts the input image data into signals of a predetermined system (for example, NTSC system) for the display panel 28, and then outputs the signals to the display panel 28. More specifically, the VRAM 20 has an A area and a B area, and image signals that were output from the CCD 38 are rewritten frame-by-frame in an alternating manner onto A area and B area of the VRAM 20 as image data. For these areas A and B, image data is read out from the area other than the area to which image data is being rewritten. A through image is thus displayed as a dynamic image on the display panel 28 by the periodic rewriting of the image data inside the VRAM 20. The photographer can confirm the angle of view for imaging by use of the through image.

When the release key is pressed halfway by the photographer after confirming the angle of view for imaging to thereby turn on the S1 switch, the CPU 12 starts AE (automatic exposure) and AF (automatic focusing) processing as imaging preparation processing. The separate image signals for each of the colors R, G and B that were output from the CCD 38 are temporarily stored in the main memory 18 through the CDS/AMP circuit 52, the A/D converter 54 and the image input controller 56, and are input to an AF detection circuit 62 and an AE/AWB detection circuit 64.

The AE/AWB detection circuit 64 includes a circuit that integrates the separate image signals for each of the colors R, G and B for each of a plurality of segmented areas that are formed by dividing the screen into a plurality of areas (for example, 16×16, 8×8 etc.), and that integrated value is supplied to the CPU 12. The CPU 12 then calculates an EV value that corresponds to the subject brightness based on the integrated value which was acquired from the AE/AWB detection circuit 64. The EV value is arranged into an EV value of the screen overall and an EV value for each segmented area on the screen and the like, and is stored in the main memory 18. The CPU 12 determines the diaphragm value and shutter speed in accordance with a predetermined program diagram, and controls the electronic shutter of the CCD 38 and the iris of the imaging lens 40 in accordance with these to obtain the appropriate exposure.

For the AF control in this camera 10, for example, contrast AF is applied which moves the focus lens (a moving lens that contributes to focus adjustment in the lens optical system comprising the imaging lens 40) such that the high frequency component of the G signal of the image signals reaches a maximum. More specifically, the AF detection circuit 62 comprises a high pass filter that allows only the high frequency component of the G signal to pass through, an absolute value processing part, an AF area extraction part which extracts signals inside a preset focus target area on the screen (for example, the central part of the screen) and an integrating part that integrates absolute value data within the AF area. The integrated value data that was obtained by the AF detection circuit 62 is notified to the CPU 12. The CPU 12 calculates focal point evaluation values (AF evaluation values) at a plurality of AF detection points while controlling the motor driver 41 for driving the imaging lens 40 to move the focus lens, and determines the lens position at which the evaluation point is at a maximum to be the focusing position. The CPU 12 then controls the motor driver 41 to move the focusing lens to the thus-determined focusing position. In this connection, calculation of an AF evaluation value is not limited to a method that utilizes a G signal, and a method may also be adopted that utilizes a brightness signal (Y signal).

In normal imaging (imaging of a single image), when the release key is half pressed (S1 turns on) or before the release key is half pressed (S1 turns on), the CPU 12 performs motion estimating processing which estimates the motion of the main subject and motion of the camera 10 at the time of actual imaging on the basis of a through image that is imaged to include the subject (or an image obtained by pre-imaging).

Further, in normal imaging (imaging of a single image), when the release key is half pressed (S1 turns on) or before the release key is half pressed (S1 turns on), the CPU 12 performs imaging conditions setting processing which sets imaging conditions including the shutter speed, diaphragm, sensitivity and light emission conditions of an electronic flash 70 to correspond to the estimated motion of the main subject and motion of the camera 10.

When the release key is fully pressed (S2 turns on) after the release key was half pressed (S1 turned on) and the imaging preparation processing was completed, actual imaging commences in order to image and record a still image of the subject.

In this actual imaging the CPU 12 carries out blur prevention control in order to prevent blurs (image blur) that are likely to occur in the image due to motion of the main subject or motion of the camera 10, while simultaneously carrying out imaging of a still image of the subject with the imaging lens 40 and the CCD 38. More specifically, the CPU 12 prevents image blurs by driving the motor driver 41 for driving the imaging lens 40 (or a motor driver 39 for driving a CCD 38) to physically impart a movement to the imaging lens 40 (or the CCD 38).

Instead of performing this kind of blur prevention control (or in addition to blur prevention control), the CPU 12 may be configured to perform image correction to correct image blurs that occurred due to motion of the main subject or motion of the camera 10 at the actual imaging.

Further, the CPU 12 performs image display control which displays on the display panel 28 a still image before image correction and a still image after image correction. In this connection, in some cases the still image before image correction may not be displayed.

The CPU 12 also performs image recording control which records a still image before image correction and a still image after image correction on the recording medium 32. In this connection, in some cases the still image before image correction may not be recorded on the recording medium 32.

When continuous imaging is selected with the mode selection key, the CPU 12 estimates the motion of the main subject and motion of the camera 10 during continuous imaging. Further, during continuous imaging the CPU 12 performs imaging conditions setting processing which sets imaging conditions including the shutter speed, diaphragm, sensitivity and light emission conditions of the electronic flash 70 in accordance with the estimated motion of the main subject and motion of the camera 10.

Further, the CPU 12 calculates white balance correction values by acquiring integrated values for each of the colors R, G and B for each segmented area from the AE/AWB detection circuit 64, and executes white balance processing on the R, G and B signals by means of the image signal processing circuit 58. After the R, G and B signals which were subjected to white balance correction by the image signal processing circuit 58 are converted into YC signals (brightness signal Y and color-difference signal C), they are compressed into a predetermined format by a compression processing circuit 66, and are recorded as image data on the recording medium 32 through a media controller 34.

When the playback mode is selected by the mode selection key, image data that was compressed and recorded on the recording medium 32 is read out through the media controller 34. The read image data is decompressed by the compression processing circuit 66 and displayed on the display panel 28 through the VRAM 20 and the video encoder 60.

Figure 2:
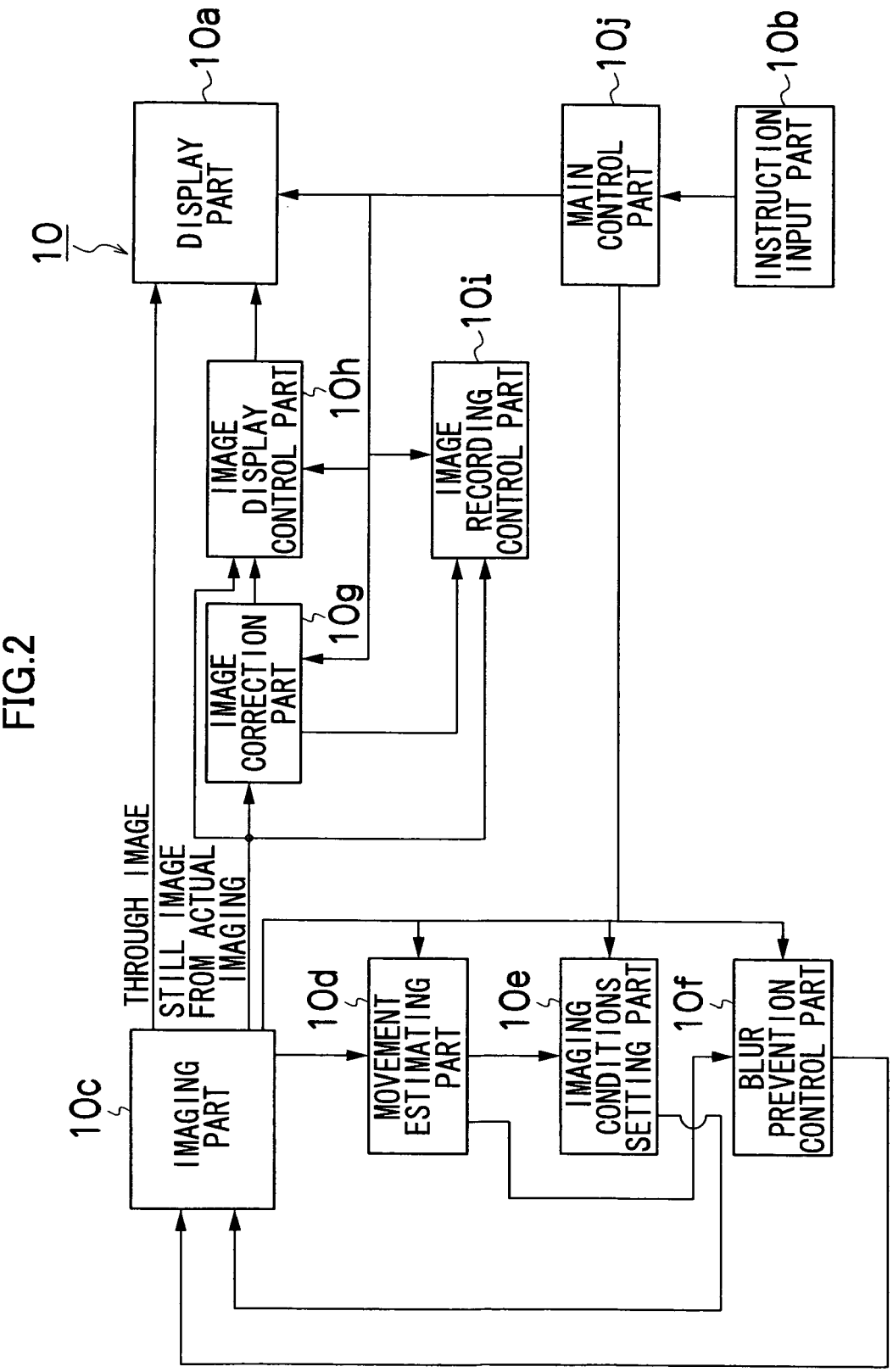
FIG. 2 is a block diagram showing a functional configuration with respect to the principal parts of the camera.

FIG. 2 is a block diagram showing a functional configuration of the principal parts of the camera 10.

In FIG. 2, the camera 10 mainly comprises a display part 10*a*, an instruction input part 10*b*, an imaging part 10*c*, a motion estimating part 10*d*, an imaging conditions setting part 10*e*, a blur prevention control part 10*f*, an image correction part 10*g*, an image display control part 10*h*, an image recording control part 10*i* and a main control part 10*j*.

The display part 10*a* is a device which displays images and a menu screen and the like. Images displayed on the display part 10*a* include through images and still images that are the actually imaged images.

The instruction input part 10*b* is a device which allows a user to input various instructions. Instructions input through the instruction input part 10*b* include an instruction to switch between continuous imaging and single image imaging, an instruction to switch between display and non-display of a through image, an imaging preparation instruction, an instruction to start imaging and an image selection instruction.

The imaging part 10*c* is a device which images a subject. Images that are imaged by the imaging part 10*c* include a through image, a still image of pre-imaging and a still image of actual imaging.

In the case of single image imaging (also referred to as "normal imaging"), before actual imaging of a still image of the subject, the motion estimating part 10*d* detects a motion vector of the subject and a motion vector of the camera to estimate the motion of the subject and motion of the camera 10 on the basis of a plurality of still images from pre-imaging or a through image obtained by imaging the subject using the imaging part 10c. In this connection, when imaging a through image the motion estimating part 10d extracts momentary still images (single frame images) at predetermined time intervals from the through image and detects a motion vector of the subject and a motion vector of the camera on the basis of the extracted plurality of still images to thereby estimate the motion of the subject and motion of the camera 10.

Further, in the case of continuous imaging, the motion estimating part 10d detects the motion vector of the subject and the motion vector of the camera during continuous imaging based on a plurality of still images that were imaged and uses these to estimate the motion of the subject and motion of the camera 10 when imaging the next still image.

The imaging conditions setting part 10e is a device that sets the shutter speed, diaphragm, sensitivity, light emission conditions of the electronic flash 70 and other imaging conditions of the camera 10 before actual imaging based on the motion of the subject and motion of the camera that were estimated by the motion estimating part 10d. The imaging conditions setting part 10e sets the imaging conditions after taking into account whether continuous imaging or single image imaging (normal imaging) is being performed. Further, the imaging conditions setting part 10e assigns weights to the motion vector of the subject and motion vector of the camera, respectively, when setting the imaging conditions.

The blur prevention control part 10f is a device which performs control that imparts a physical movement to the imaging part 10c so as to prevent blurs occurring in a still image that is actually imaged, based on motion of the subject and motion of the camera that was estimated by the motion estimating part 10d. The blur prevention control part 10f imparts a physical movement to the imaging part 10c after taking into account whether continuous imaging or single image imaging (normal imaging) is being performed. Further, the blur prevention control part 10f assigns weights to the motion vector of the subject and motion vector of the camera 10, respectively, when imparting a physical movement to the imaging part 10c.

The image correction part 10g is a device which corrects a still image that was actually imaged by the imaging part 10c, based on the motion of the subject and motion of the camera that was estimated by the motion estimating part 10d. The image correction part 10g corrects the still image that was actually imaged after taking into account whether continuous imaging or single image imaging (normal imaging) is being performed. Further, the image correction part 10g corrects the still image that was actually imaged based on the motion vector of the subject and motion vector of the camera.

The image display control part 10h performs control to display one or a plurality of still images that were corrected by the image correction part 10g on the display part 10a. The image display control part 10h also performs control to display a still image before correction on the display part 10a together with the still image after correction.

Further, the image display control part 10h performs control which changes the ratio of the sizes of a still image after correction and a still image before correction that are simultaneously displayed on the display part 10a. The image display control part 10h also performs control which changes the ratio of the sizes of two or more still images after correction that are simultaneously displayed on the display part 10a.

In addition, the image display control part 10h performs control to switch the screen size of the display part 10a in accordance with whether or not to simultaneously display both a still image after correction and a still image before correction. The image display control part 10h also performs control to switch the screen size of the display part 10a in accordance with the number of still images after correction to be displayed simultaneously.

The image recording control part 10i performs control which records still images that were actually imaged on a recording medium.

In this connection, when a plurality of images were selected by the instruction input part 10b, the image recording control part 10i performs recording after associating together the selected still images.

Further, although in the case of continuous imaging the image recording control part 10i performs control to record both still images before correction and still images after correction without waiting for input of a selection instruction from the instruction input part 10b, in the case of single image imaging the image recording control part 10i waits for input of a selection instruction before recording the images.

Next, the correlation between the components of the camera 10 having the functional configuration shown in FIG. 2 and the components of the camera 10 having the specific configuration shown in FIG. 1 will be described in brief. The display part 10a of FIG. 2 principally comprises the display panel 28 of FIG. 1; the instruction input part 10b of FIG. 2 principally comprises the key 24 and the display panel 28 of FIG. 1; the imaging part 10c of FIG. 2 principally comprises the imaging lens 40, CCD 38, motor drivers 41 and 39, timing generator 50, and electronic flash 70 of FIG. 1; and the motion estimating part 10d, imaging conditions setting part 10e, blur prevention control part 10f, image correction part 10g, image display control part 10h, image recording control part 10i and main control part 10j of FIG. 2 principally comprise the CPU 12 of FIG. 1.

Various imaging situations can be considered when imaging a still image, depending on whether or not the main subject is moving and whether or not the camera is moving. Four typical imaging situations are described below.

Figure 3:
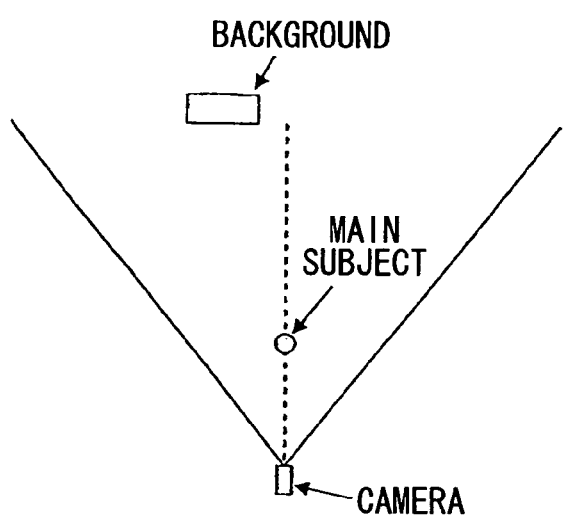
FIG. 3 is an explanatory drawing used to describe an imaging situation in which both the subject and the camera are motionless.
Figure 3:
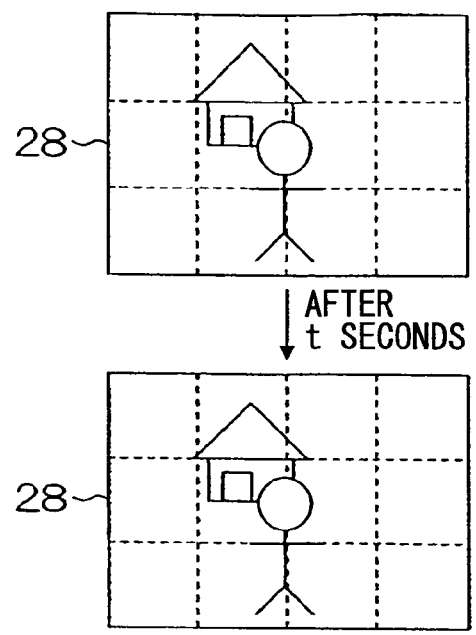

Firstly, as shown in FIG. 3, in some imaging situations both the main subject and the camera are motionless. An example of this is a situation in which the main subject and the camera are motionless when capturing a memorial image. Further, since an imaging situation in which the main subject and the camera both make exactly the same motion is a situation in which, in a relative sense, both parties are motionless, it can be treated in the same way as an imaging situation in which both the main subject and the camera are motionless.

Figure 4:
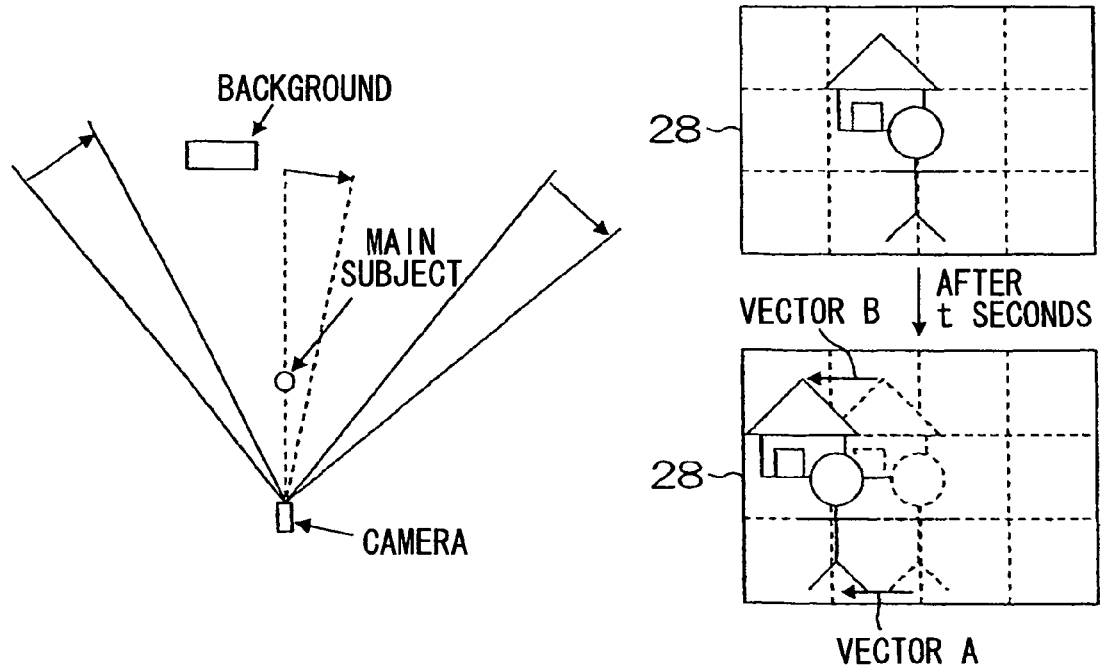
FIG. 4 is an explanatory drawing used to describe an imaging situation in which the subject is motionless and the camera is moving.

Secondly, as shown in FIG. 4, in some imaging situations although the main subject is actually motionless the camera is moving. An example of this situation is one in which imaging is performed while moving the camera to the left or the right with respect to a motionless subject.

Figure 5:
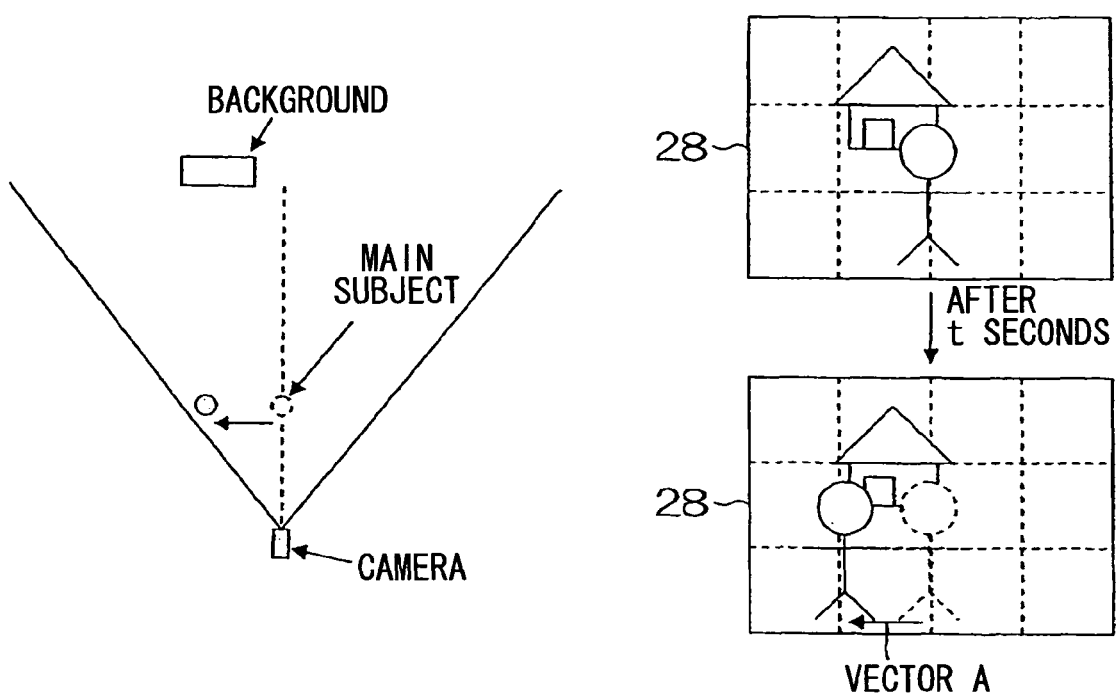
FIG. 5 is an explanatory drawing used to describe an imaging situation in which the subject is moving and the camera is motionless.

Thirdly, as shown in FIG. 5, in some imaging situations although the main subject is moving the camera is motionless.

Figure 6:
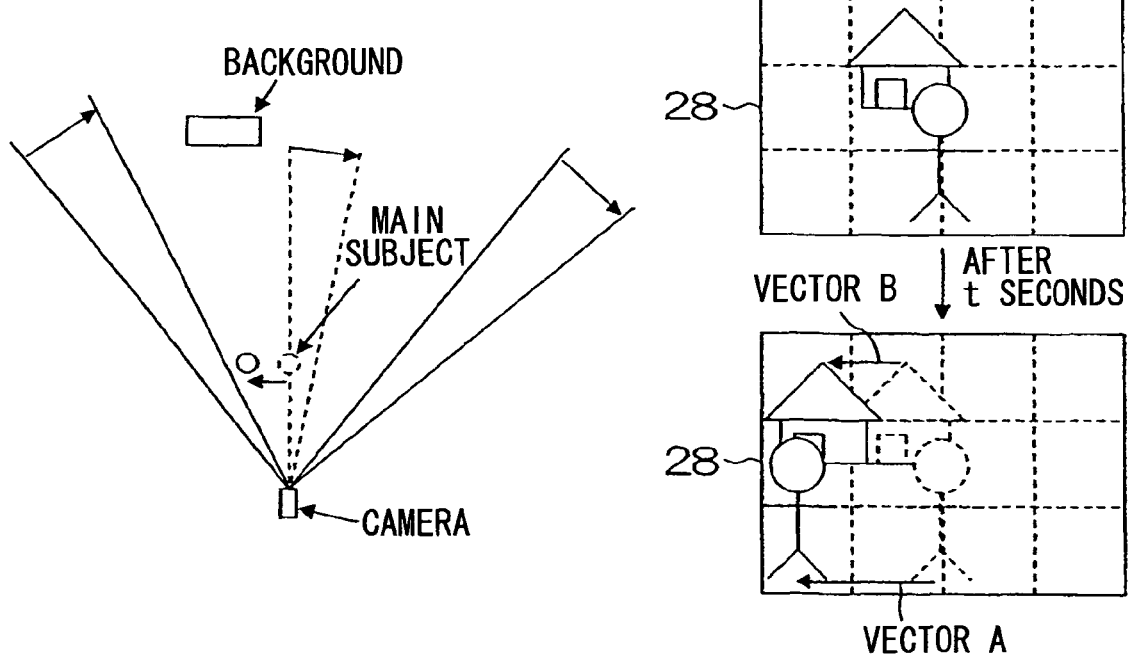
FIG. 6 is an explanatory drawing used to describe an imaging situation in which both the subject and the camera are moving.

Fourthly, as shown in FIG. 6, in some imaging situations the main subject is moving and at the same time the camera is moving in a different manner to the subject. An example of this situation is one in which imaging is performed while moving a camera to the left or right to follow the movement of the main subject who is running in a sports event.

Further, the imaging methods employed when imaging a still image include, firstly, single image imaging (also referred to as "normal imaging") in which still images are imaged one by one, and secondly, continuous imaging in which a plurality of still images are imaged in succession at predetermined time intervals. In most cases of single image imaging the camera is motionless at the moment of imaging each still image even when the camera was moved to follow the movement of the main subject. In contrast, when performing continuous imaging while moving the camera to follow the movement of the main subject, in most cases the camera is moving and not motionless even at the moment of imaging each still image.

The combinations of the aforementioned four different imaging situations (situations in which the main subject or the camera is moving or motionless) and two imaging methods (continuous imaging or not) produce a total of eight different combinations. It is desirable that setting of the imaging conditions, blur prevention control, image correction, image display control and image recording control are optimally performed for each of these combinations.

Therefore, in order to recognize the imaging situation the CPU 12 first performs control to detect the motion vector of the main subject and motion vector of the camera by acquiring a plurality of still images prior to actual imaging of a still image.

The principles of a method which detects a motion vector from a plurality of still images with different imaging times in a time series will now be described using FIGS. 7 to 11.

Figure 7:
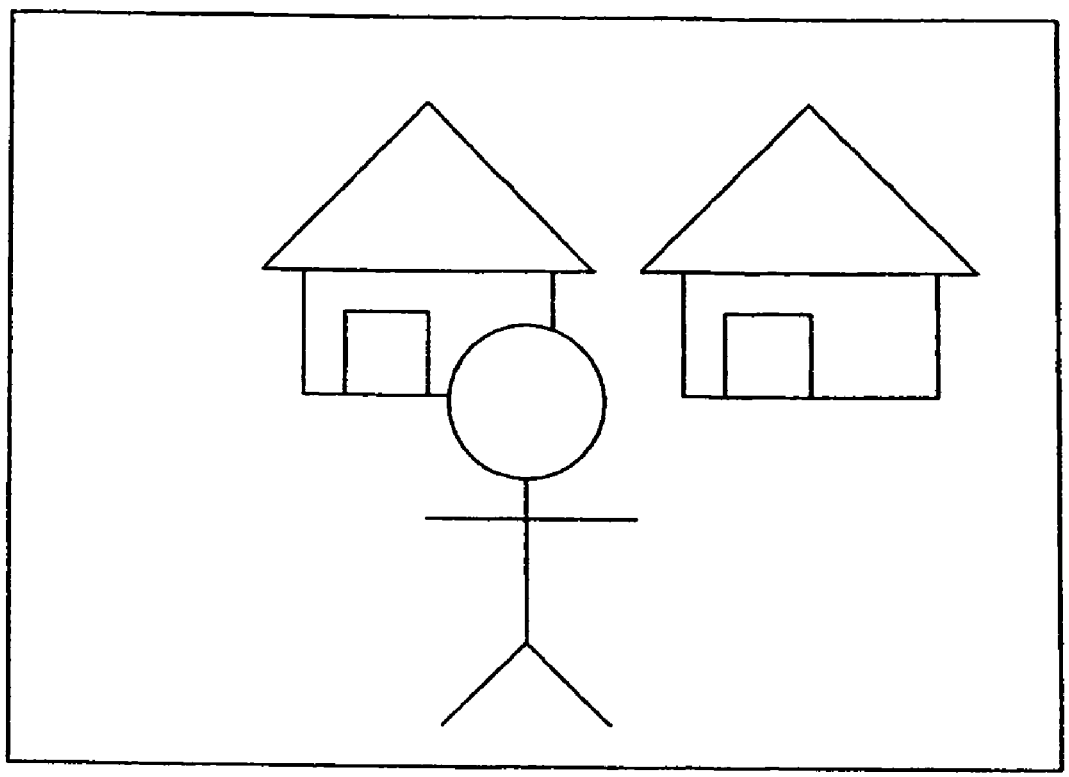
FIG. 7 is an explanatory drawing used to explain a first edge detection in order to detect a motion vector.
Figure 8:
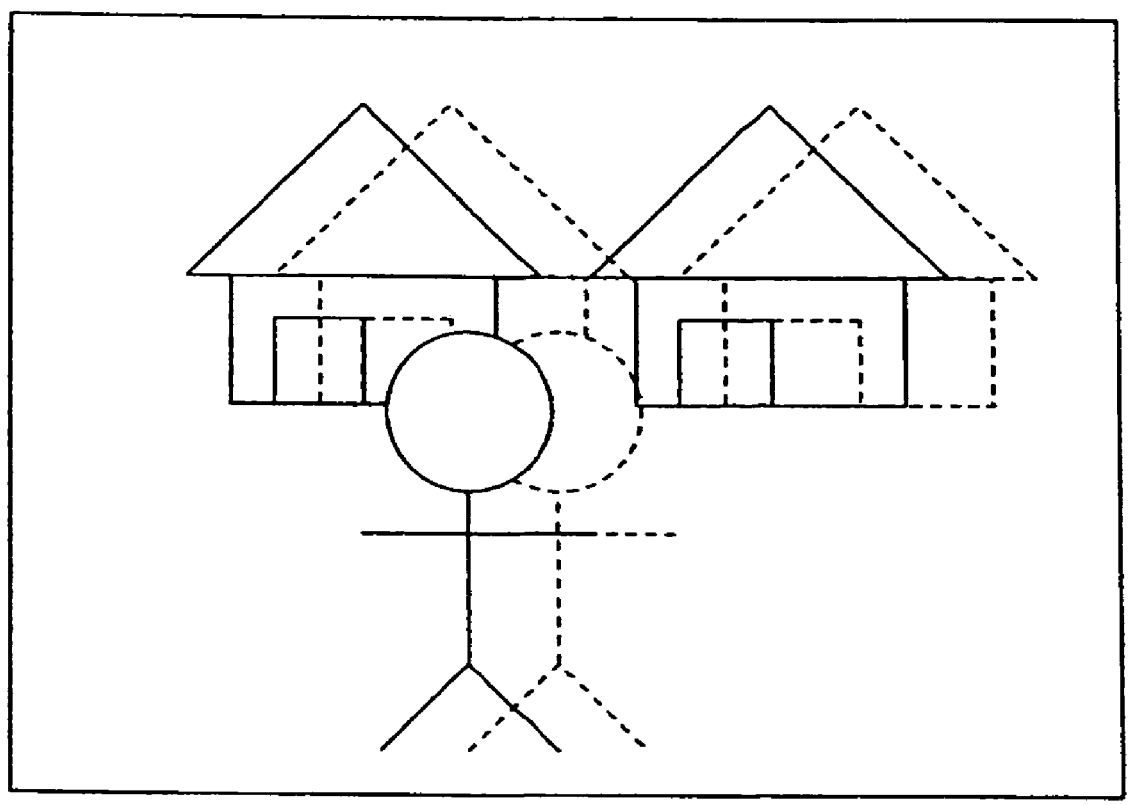
FIG. 8 is an explanatory drawing used to explain a second edge detection in order to detect a motion vector.
Figure 9:
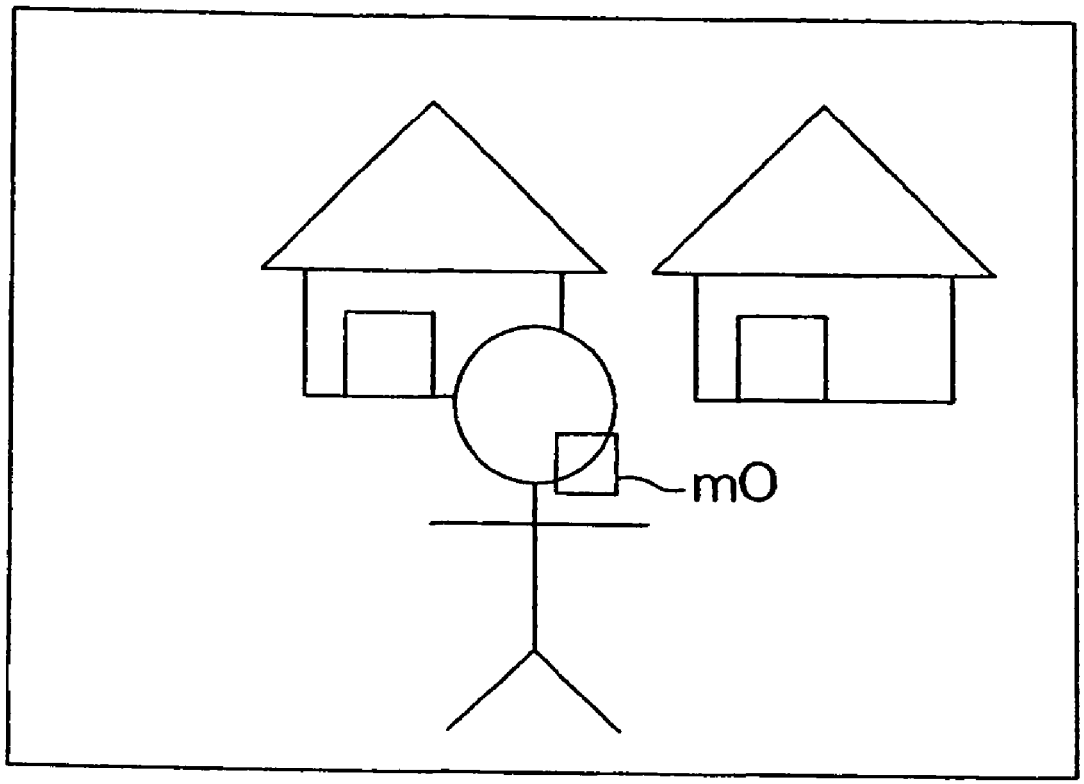
FIG. 9 is an explanatory drawing used to explain the detection of the initial position of a main subject in order to detect a motion vector.
Figure 10:
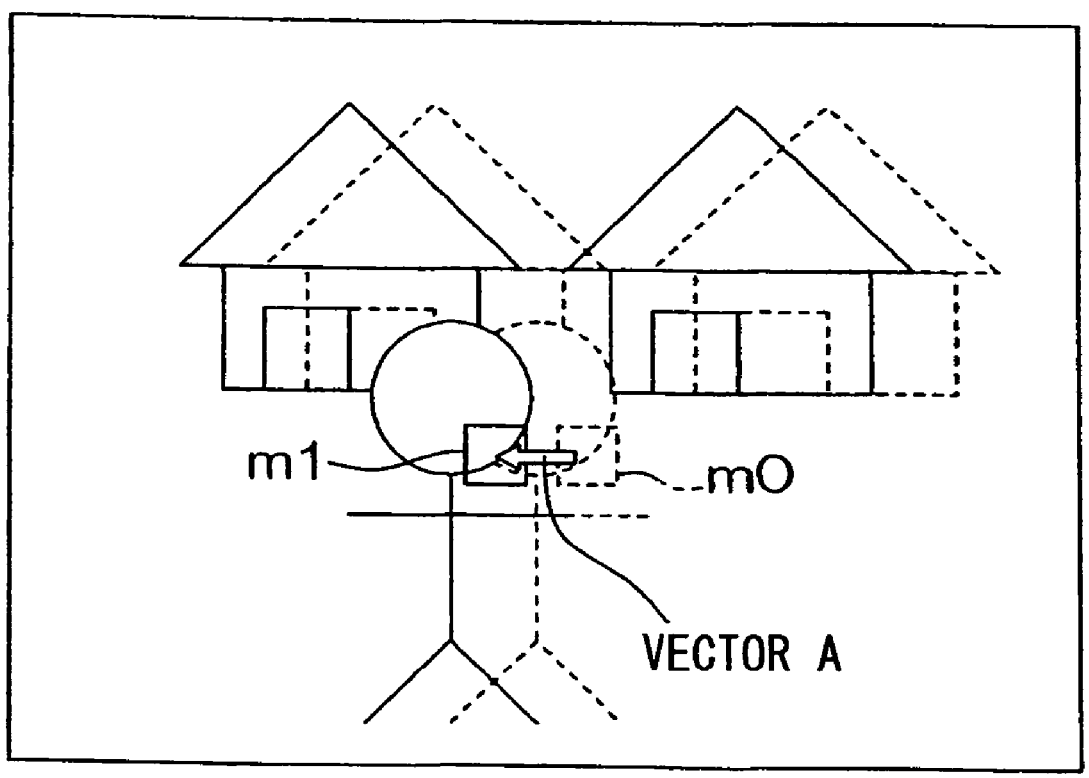
FIG. 10 is an explanatory drawing used to explain the detection of an A vector in which the motion vector of the subject was added to the motion vector of the camera.

First, edges are detected by differentiation for a still image that was imaged at a given time t0. In FIG. 7, the edges of the still image at time t0 are shown by solid lines. Similarly, the edges are detected by differentiation for a still image that was imaged at a time t1 that is t seconds after the time t0. FIG. 8 shows the edges of the still image at time t0 that were detected earlier with a dotted line, and the edges of the still image at time t1 that were newly detected with a solid line. Next, as shown in FIG. 9, at an edge of the image at time t0, a position nearest to the position that matched the focus and which is equal to or greater than a predetermined threshold value is taken as an initial position of a main subject m0. The motion vector is then detected by comparing the edges of the image at time t0 and the edges of the image at time t1 by a known block matching method. In FIG. 10, a vector A (motion vector in the main subject region) from the initial position m0 of the main subject at time t0 to a position m1 of the main subject at time t1 is detected.

In this case the block matching method determines the sum of absolute difference for the points (x, y) at the time t0 and points (x+i, y+j) at the time t1 on the still images and takes the points (x+i, y+j) at the time t1 that satisfy the following formula 1 as the corresponding points of the points (x, y) of the time t0. Here, this is represented as motion vector (i, j).

$$e_B(x, y) = \min\left(\sum_{n>0}^{N-1}\sum_{m>0}^{N-1} |f_{t_0}(x+m, y+n) - f_{t_1}(x+m+i, y+n+j)|\right)$$ [Formula 1]

Figure 11:
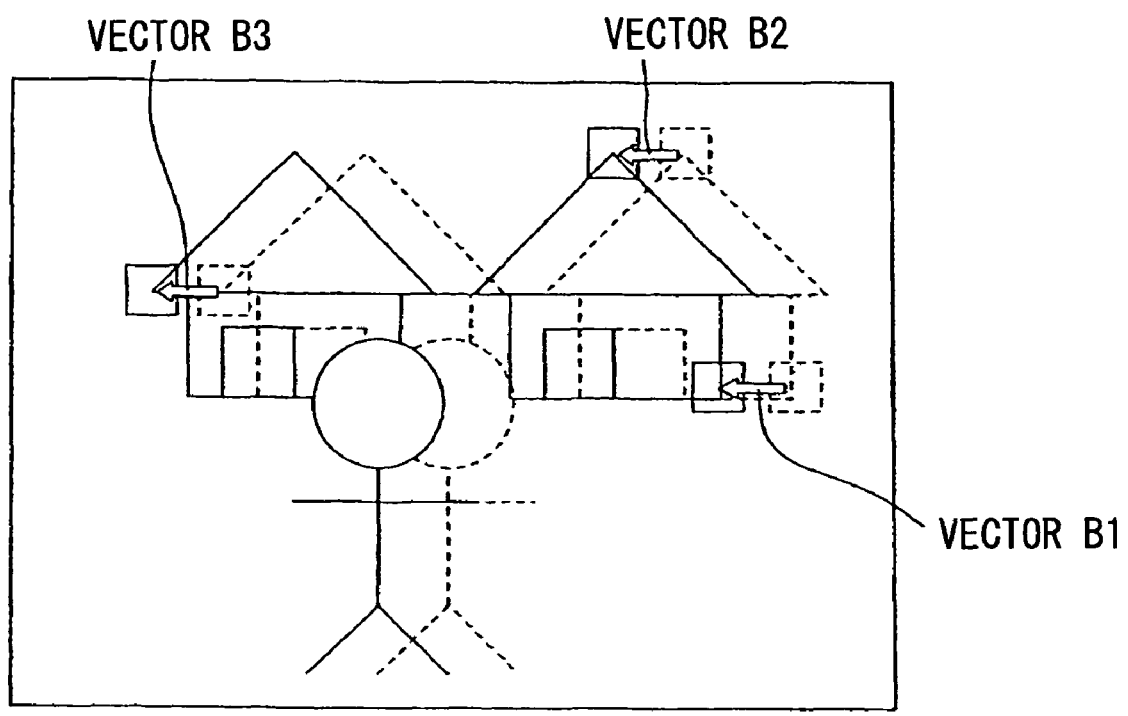
FIG. 11 is an explanatory drawing used to explain the detection of B vectors comprising the motion vectors of the camera.

Regarding a motion vector for the background region, a plurality of motion vectors is detected in the background to determine a motion vector that is a representative of the detected plurality of motions. For example, n motion vectors are detected in the region surrounding the region of the main subject in order to calculate the differences between one another for the detected n motion vectors, and a motion vector that is the mean of motion vectors for which the difference is within a predetermined allowable range is taken as the representative motion vector. For example, as shown in FIG. 11, motion vectors B1, B2 and B3 are respectively detected for three regions in which edges are present in the region surrounding the main subject, and when the differences between the detected three motion vectors B1, B2 and B3 are within a predetermined allowable range the mean vector of the motion vectors that are within that allowable range (for example, all of the three motion vectors B1, B2 and B3) is taken as the representative motion vector (motion vector of background region).

In this connection, although the foregoing described a method which detects motion vectors from two still images in a time series using a block matching method, in the present invention the detection of motion vectors is not particularly limited to the use of a block matching method. For example, a method also exists that detects motion vectors using wavelet transformation.

However, when detecting motion vectors using a plurality of still images that were actually imaged, it is not possible to set the optimal imaging conditions or perform blur prevention at the time of that actual imaging.

Therefore, in the present embodiment the detection of motion vectors is performed after enabling the setting of optimal imaging conditions and the performance of blur prevention when actually imaging the still images. There are various methods for this type of motion vector detection.

Firstly, there is a method which detects a motion vector from a through image prior to actually imaging a still image.

Secondly, there is a method which detects a motion vector after performing pre-imaging prior to actually imaging a still image.

Thirdly, there is a method which detects a motion vector from imaged still images that are obtained during continuous imaging.

Figure 12:
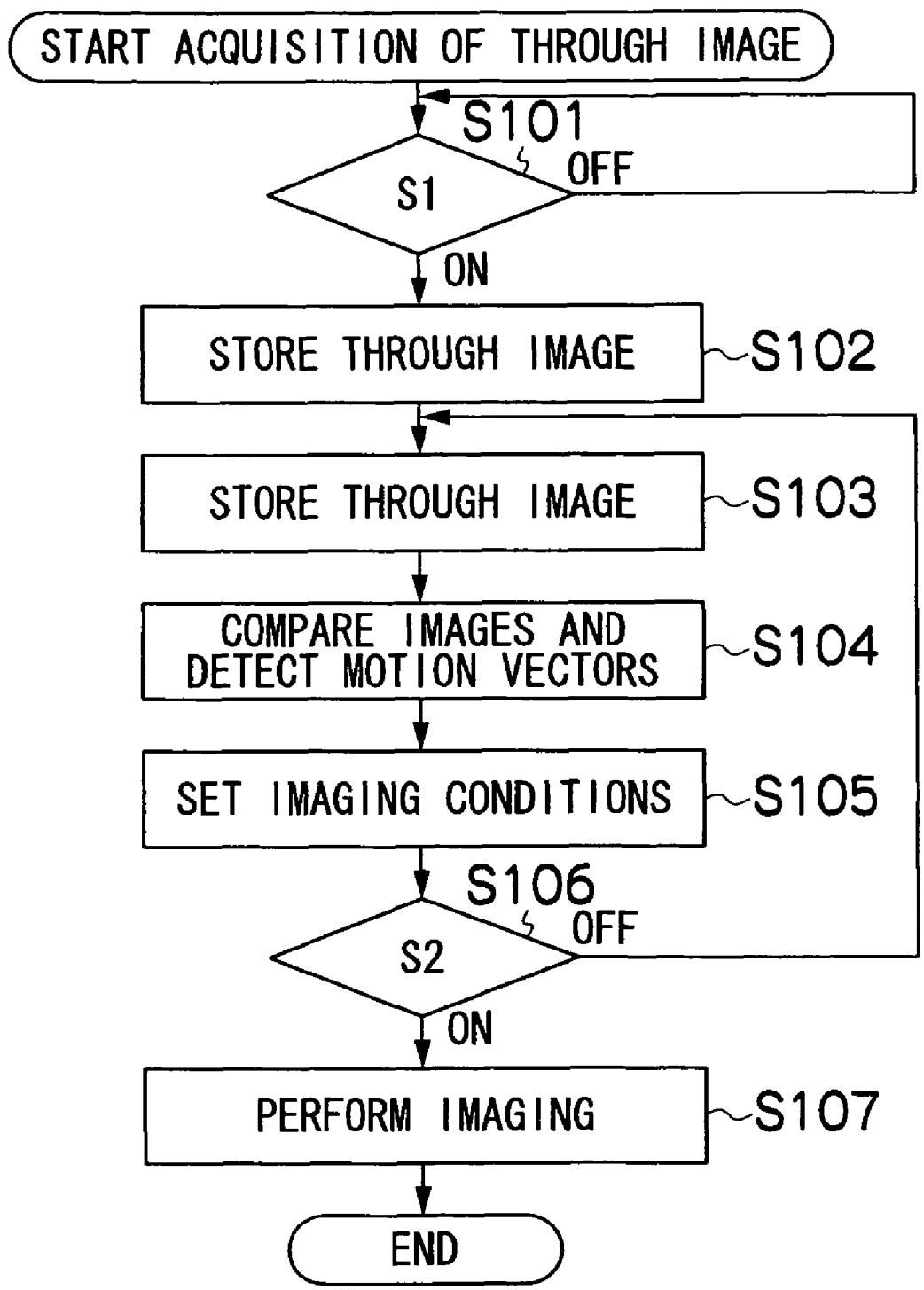
FIG. 12 is a flowchart showing the flow of one example of imaging processing that performs detection of a motion vector from a through image after an imaging preparation instruction.

FIG. 12 is a flowchart showing the flow of one example of imaging processing in a method which detects a motion vector from a through image prior to actually imaging a still image.

In this connection, for the timing to start displaying a through image on the display panel 28, for example, a method exists which starts displaying a through image when the imaging mode is selected by means of the mode selection key, and a method exists which starts the display when a key (through image display key) is operated that specifies the through image display under the imaging mode.

In FIG. 12, the CPU 12 determines whether or not the release key was half pressed (i.e. whether or not the S1 switch is on) in a state in which a through image is displayed on the display panel 28 (S101). When the release key was half pressed a still image (one frame image) of a particular moment of the imaging time is extracted from the through image and temporarily stored in the main memory 18 (S102). Thereafter, still images of particular moments are extracted at predetermined time intervals from the through image and temporarily stored in the main memory 18 (S103). Next, motion vectors are detected by comparing the extracted still images (S104), and the imaging conditions are then determined on the basis of the detected motion vectors and set in the camera 10 (S105). The CPU 12 then determines whether or not the release key was fully pressed (i.e. whether or not the switch S2 is on) (S106), and when the release key was fully pressed the actual imaging of a still image is performed (S107).

Figure 13:
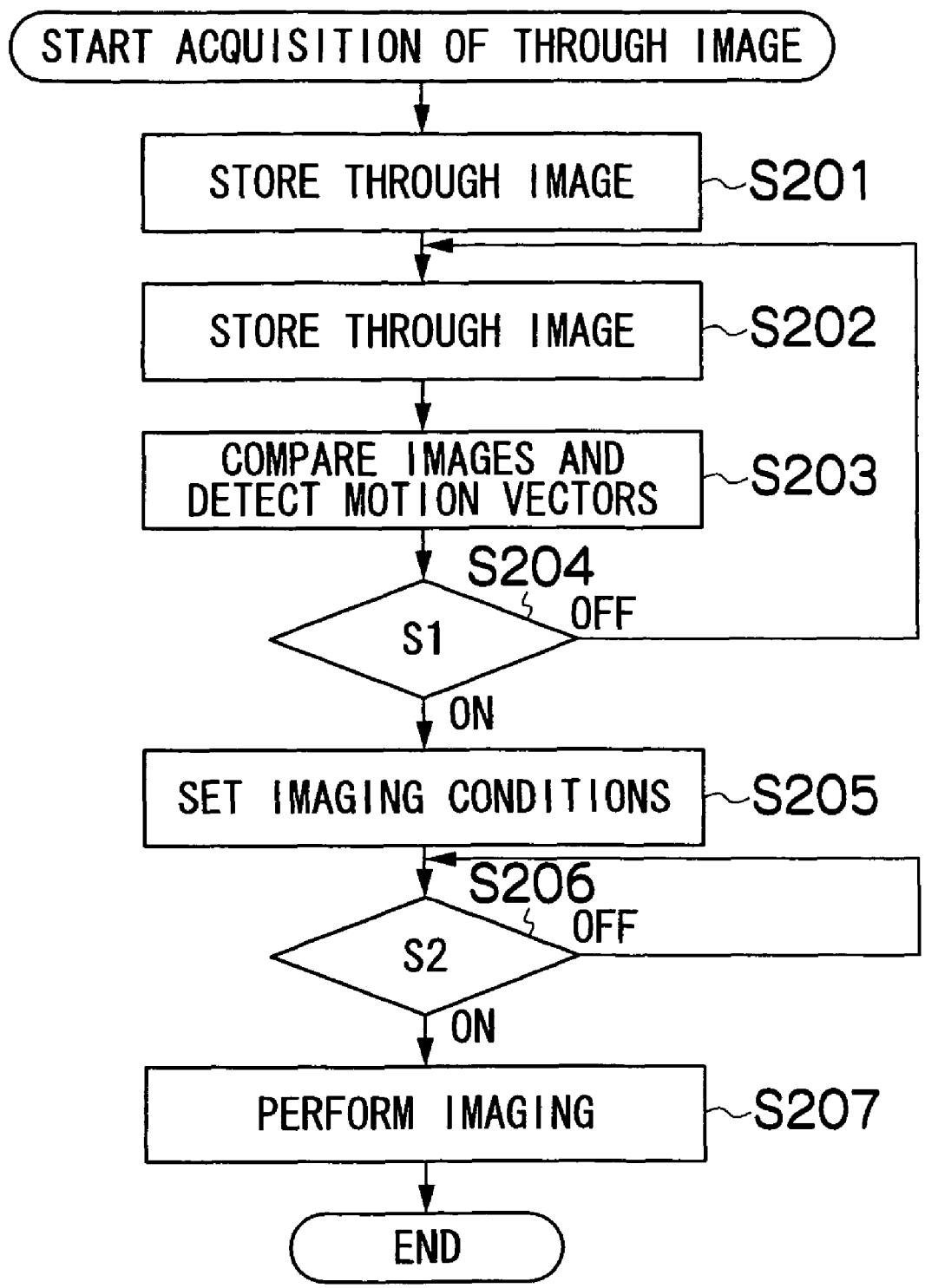
FIG. 13 is a flowchart showing the flow of one example of imaging processing that performs detection of a motion vector from a through image prior to an imaging preparation instruction.

The present invention is not particularly limited to a case in which detection of motion vectors starts when the release key is half pressed, and as shown in FIG. 13 a configuration may be adopted in which motion vectors are detected prior to the release key being half pressed.

In FIG. 13, extraction of a still image (one frame image) of a particular moment from the through image starts in a state in which a through image is displayed on the display panel 28, and the still image is temporarily stored in the main memory 18 (S201). Thereafter, still images of particular moments are extracted at predetermined time intervals from the through image and temporarily stored in the main memory 18 (S202). The CPU 12 then detects motion vectors by comparing the extracted still images (S203) and determines whether or not the release key was half pressed (i.e. whether or not the S1 switch is on) (S204). If the release key was half pressed the CPU 12 determines the imaging conditions based on the detected motion vectors and sets the conditions in the camera 10 (S205). The CPU 12 then determines whether or not the release key was fully pressed (i.e. whether or not the switch S2 is on) (S206), and when the release key was fully pressed the actual imaging of a still image is performed (S207).

Figure 14:
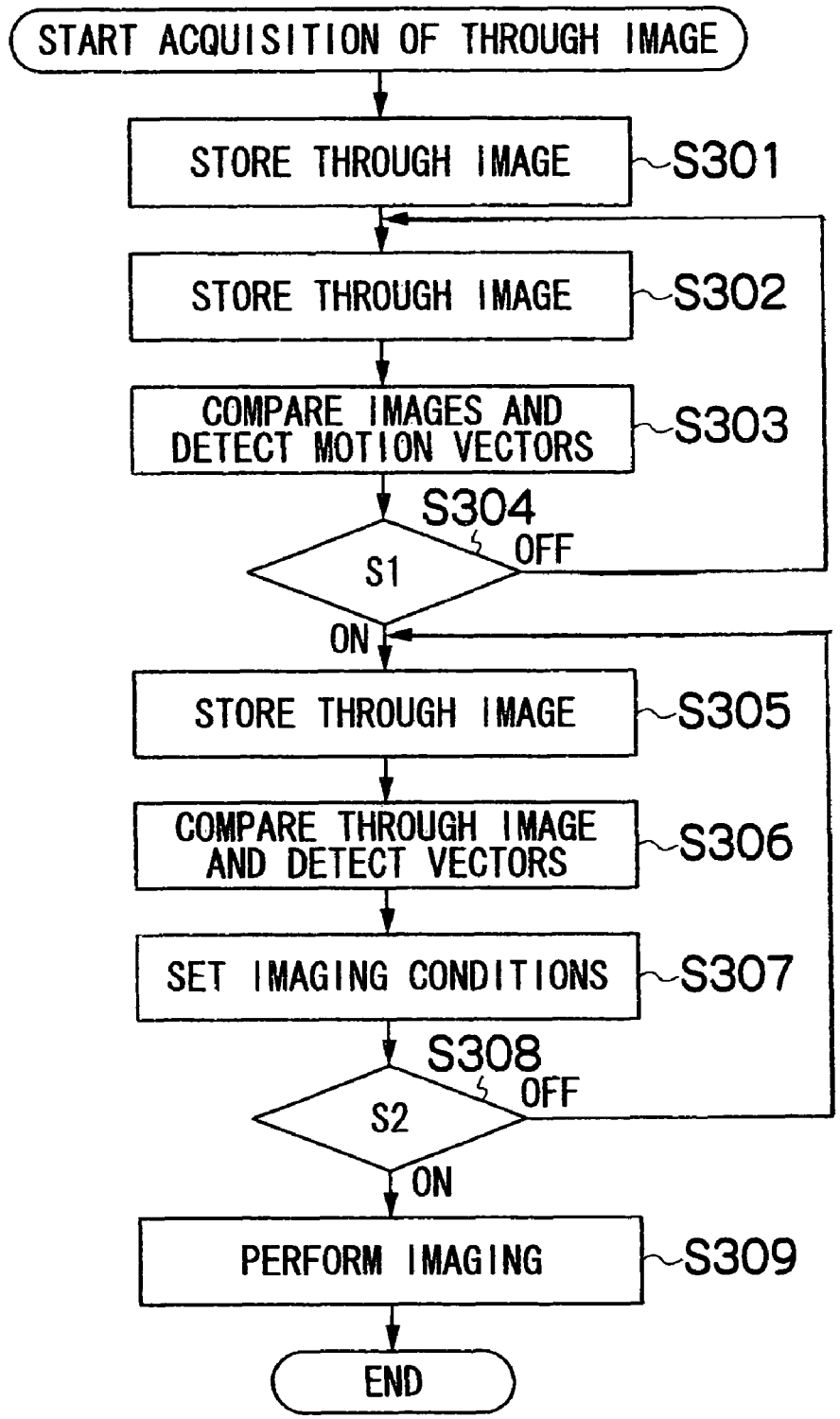
FIG. 14 is a flowchart showing the flow of one example of imaging processing that starts detection of a motion vector from a through image prior to an imaging preparation instruction and continues the detection until an instruction to start imaging is input.

Further, as shown in FIG. 14, a configuration may be adopted in which the detection of motion vectors starts prior to the release key being half pressed and the detection of motion vectors continues until the release key is fully pressed.

In FIG. 14, extraction of a still image (one frame image) of a particular moment from the through image starts in a state in which a through image is displayed on the display panel 28, and the still image is temporarily stored in the main memory 18 (S301). Thereafter, still images of particular moments are extracted at predetermined time intervals from the through image and temporarily stored in the main memory 18 (S302). The CPU 12 then detects motion vectors by comparing the extracted still images (S303) and determines whether or not the release key was half pressed (i.e. whether or not the S1 switch is on) (S304). Even after the release key was half pressed the CPU 12 continues to extract still images of particular moments from the through image and temporarily store them in the main memory 18 (S305), detects motion vectors by comparing the extracted still images (S306), and determines the imaging conditions based on the detected motion vectors and sets the conditions in the camera 10 (S307). The CPU 12 then determines whether or not the release key was fully pressed (i.e. whether or not the switch S2 is on) (S308), and when the release key was fully pressed the actual imaging of a still image is performed (S309).

Figure 15:
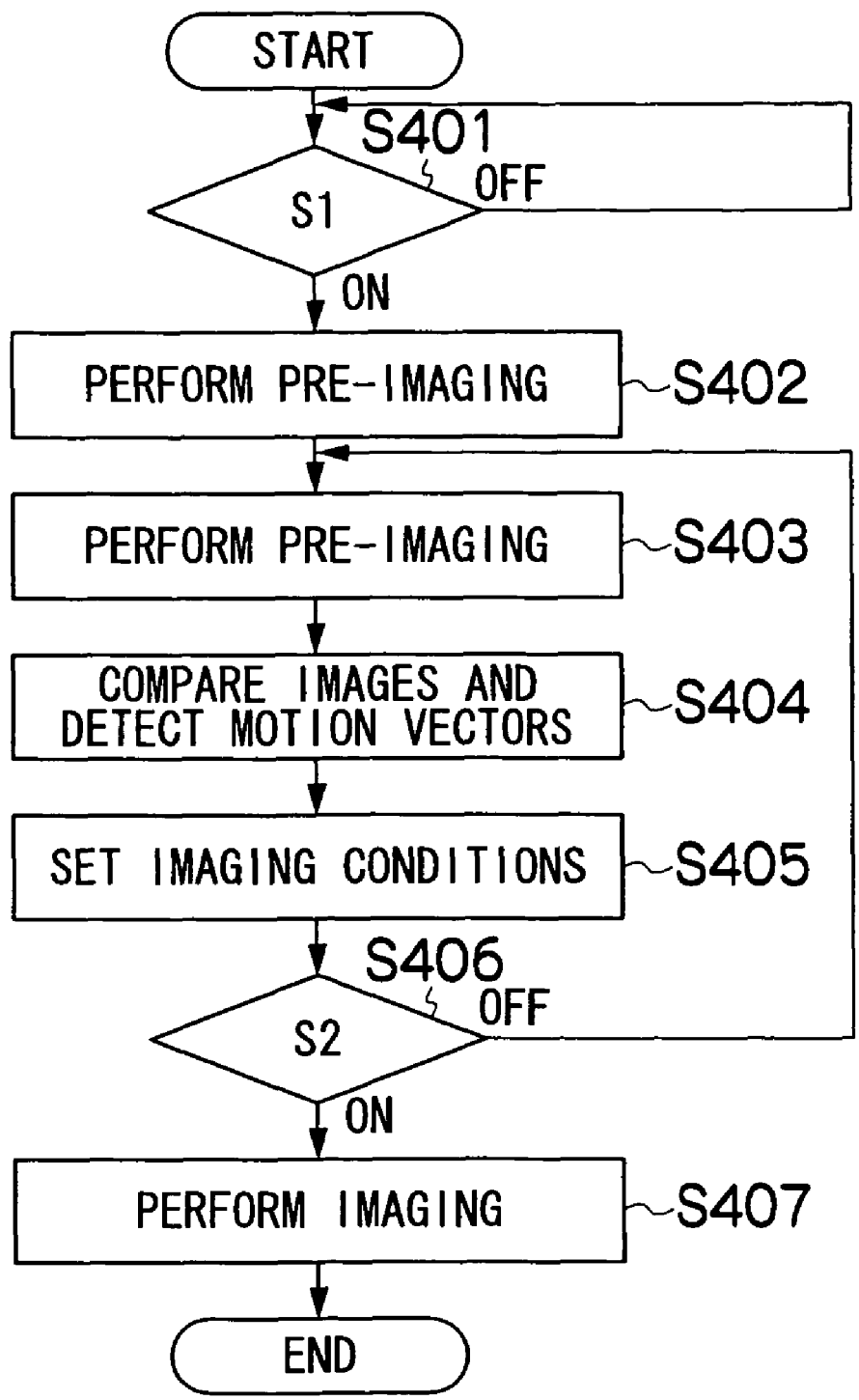
FIG. 15 is a flowchart showing the flow of one example of imaging processing that performs pre-imaging to detect a motion vector.

FIG. 15 is a flowchart showing the flow of one example of imaging processing in a method which detects motion vectors by performing pre-imaging prior to the actual imaging of a still image.

In FIG. 15, first the CPU 12 determines whether or not the release key was half pressed (i.e. whether or not the S1 switch is on) (S401). When the release key is half pressed, pre-imaging is performed and a still image of a particular moment is temporarily stored in the main memory 18 (S402). Thereafter, at predetermined time intervals pre-imaging is performed and still images of particular moments are temporarily stored in the main memory 18 (S403). The CPU 12 then detects motion vectors by comparing the still images that were obtained by pre-imaging (S404), and determines the imaging conditions based on the detected motion vectors and sets the conditions in the camera 10 (S405). The CPU 12 then determines whether or not the release key was fully pressed (i.e. whether or not the switch S2 is on) (S406), and when the release key was fully pressed the actual imaging of a still image is performed (S407).

Figure 16:
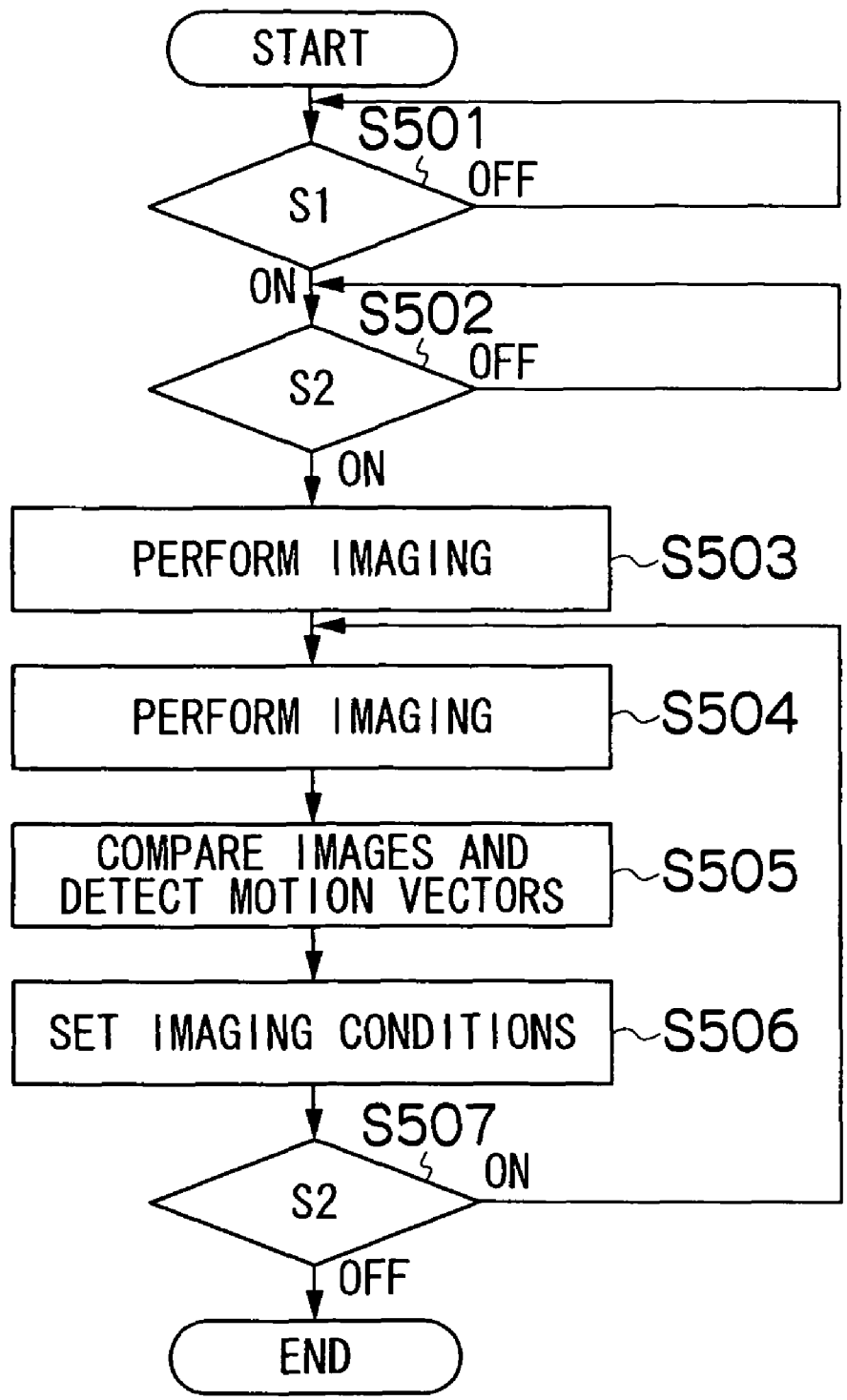
FIG. 16 is a flowchart showing the flow of one example of continuous imaging processing.

FIG. 16 is a flowchart showing the flow of one example of image processing in a method which detects motion vectors from images obtained during continuous imaging.

In FIG. 16, first the CPU 12 determines whether or not the release key was half pressed (i.e. whether or not the S1 switch is on) (S501). When the release key was half pressed, the CPU performs predetermined image preparation processing such as automatic focusing, and then determines whether or not the release key was fully pressed (S502). When the release key was fully pressed, continuous imaging starts and a still image is temporarily stored in the main memory 18 (S503). Thereafter, at predetermined time intervals, imaging of still images is performed and the still images are temporarily stored in the main memory 18 (S504). The CPU 12 then detects motion vectors by comparing the still images (S505), and determines the imaging conditions based on the detected motion vectors and sets the conditions in the camera 10 (S506). Thereafter, the CPU 12 determines whether or not the release key was fully pressed again (i.e. whether or not the S2 switch is on) (S507). In a period in which the S2 switch is off, imaging of still images is performed at predetermined time intervals and the still images are temporarily stored in the main memory 18 (S504), motion vectors are detected by comparing the still images (S505), and the CPU 12 determines the imaging conditions based on the detected motion vectors and sets the conditions in the camera 10 (S506). When the release key is pressed fully again the continuous imaging ends.

Regarding determination of the imaging situation, first, the main subject region and background region are determined to determine a motion vector in the main subject region and a motion vector in the background region, and then the imaging situation is determined by determining the actual motion vector of the main subject and the motion vector of the camera on the basis of the motion vector in the main subject region and motion vector in the background region.

Determination of the main subject region and background region is carried out, for example, using an auto focus function. In this case, the vicinity of a position which matches the focus is determined as the main subject region, and a motion vector in this main subject region is obtained.

When the main subject is a person, the main subject region may be determined using a facial extraction method. For example, when portrait imaging mode (portrait mode) is selected by the mode selection key, the face of the person in the image is detected by a known face detecting method and an area including this face may be taken as the subject region.

In this connection, a motion vector in a main subject region on an image (hereunder referred to as "vector A") is, in fact, a vector in which the motion vector of the subject was added to the motion vector of the camera. Further, a motion vector in a background region (hereunder referred to as "vector B") can be considered as the motion vector of the camera. Therefore, it is possible to determine the difference between vector A and vector B (vector A−vector B), and consider the result to be the actual motion vector of the subject (hereunder referred to as "vector C").

The imaging situation is determined as described below on the basis of these motion vectors.

When vector B (motion vector of camera) and vector C (motion vector of main subject) are both 0 vectors the imaging situation is determined to be one in which, as shown in FIG. 3, both the subject and the camera are motionless (hereunder, referred to as "imaging situation A"). This determination may also be made based on the criterion that vector A (=vector B+vector C) is 0.

When vector B (motion vector of camera) is not a 0 vector and vector C (motion vector of main subject) is a 0 vector the imaging situation is determined to be one in which, as shown in FIG. 4, the subject is motionless and the camera is moving (hereunder, referred to as "imaging situation B"). This determination may also be made based on the criterion that vector A=vector B.

When vector B (motion vector of camera) is a 0 vector and vector C (motion vector of main subject) is not a 0 vector the imaging situation is determined to be one in which, as shown in FIG. 5, the subject is moving and the camera is motionless (hereunder, referred to as "imaging situation C"). This determination may also be made based on the criterion that vector B is a 0 vector and vector A (=vector B+vector C) is not 0.

When vector B (motion vector of camera) and vector C (motion vector of main subject) are both not 0 vectors the imaging situation is determined to be one in which, as shown in FIG. 6, both the subject and the camera are moving (hereunder, referred to as "imaging situation D"). This determination may also be made based on the criterion that both vector B and vector A (=vector B+vector C) are not 0.

When actually imaging a still image, the camera 10 of this embodiment sets the imaging conditions through control of the CPU 12 that is based mainly on the motion of the subject and motion of the camera immediately before imaging the still image.

More specifically, the CPU 12 sets imaging conditions such as shutter speed, sensitivity and light emission conditions of the electronic flash 70, based on the imaging situation (showing whether the main subject and the camera is moving or motionless) that was determined from the motion vectors and the imaging method (whether or not continuous imaging is set) set in the camera 10. An example thereof is described hereunder.

When performing single image imaging in imaging situation B (camera is moving and the main subject is motionless) as shown in FIG. 4, since there is an extremely high probability that the main subject will not move during exposure for the actual imaging, it is possible to make the shutter speed slower and lower the sensitivity.

When performing single image imaging in imaging situation C (camera is motionless and the main subject is moving) as shown in FIG. 5, since there is an extremely high probability that the main subject will move during exposure for the actual imaging, in comparison to the case of imaging situation A or imaging situation B, the shutter speed is made faster and the sensitivity is increased in accordance with the size of vector C (motion vector of main subject).

When performing continuous imaging in imaging situation D (camera and main subject are both moving) also, as shown in FIG. 6, since there is an extremely high probability that the main subject will move during exposure for the actual imaging, in comparison to the case of imaging situation A or imaging situation B, the shutter speed is made faster and the sensitivity is increased in accordance with the size of vector A (or vector C).

In this connection, when setting imaging conditions such as the shutter speed, which motion vector is taken as a reference depends on whether the photographer places priority on the main subject or on the background.

It is also possible to assign weights to each motion vector when deciding the imaging conditions. Specific examples of assigning weights include, when taking vector X as a reference vector to be the reference for the setting values, vector X=0.5×vector A+0.5×vector C and vector X=0.2×vector A+0.8×vector C.

In this connection, for the camera 10 shown in FIG. 1, the shutter speed setting is set in the CCD 38 by the CPU 12 through the timing generator 50. The diaphragm setting is set in the imaging lens 40 by the CPU 12 through the motor driver 41 for the imaging lens. The sensitivity is set in the CCD 38 by the CPU 12. The light emission conditions of the electronic flash 70 are set in the electronic flash 70 by the CPU 12.

When actually imaging a still image, the camera 10 of this embodiment is capable of imparting a physical movement to the imaging lens 40 (or CCD 38) during exposure of the still image so as to correct blurring that occurs in the actually imaged still image through control of the CPU 12 that is based mainly on the motion of the subject and motion of the camera.

More specifically, blurs are prevented by moving the imaging lens 40 (or CCD 38) during exposure for actual imaging on the basis of the imaging situation (indicates whether the main subject or camera is moving or motionless) that was determined from the motion vectors, the imaging method set in the camera 10 (whether or not continuous imaging is performed), and the motion vectors of the main subject and the camera. An example thereof is described hereunder.

When performing single image imaging in imaging situation B (camera is moving and main subject is motionless) as shown in FIG. 4, since there is an extremely high probability that the main subject will not move during exposure for the actual imaging, the imaging lens 40 (or CCD 38) is not physically moved.

When performing single image imaging in imaging situation C (camera is motionless and main subject is moving) as shown in FIG. 5, since there is an extremely high probability that the main subject will move during exposure for the actual imaging, blurs are prevented optically by physically moving the imaging lens 40 (or CCD 38) based on vector C (motion vector of main subject).

When performing continuous imaging in imaging situation D (camera and main subject are both moving) also, as shown in FIG. 6, since there is an extremely high probability that the main subject will move during exposure for the actual imaging, blurs are prevented optically by physically moving the imaging lens 40 (or CCD 38) based on vector A (or vector C).

In this connection, when performing blur prevention control, which of the motion vectors is taken as a reference depends on whether the photographer places priority on the main subject and on the background. In general, when background blurring was prevented some blurring remains in the main subject, and when blurring of the main subject was prevented some background blurring remains.

It is also possible to assign weights to each motion vector to determine the amount of motion in order to prevent blurring. Specific examples of assigning weights include, when taking vector X as a reference vector to be the reference for the motion amount, vector X=0.5×vector A+0.5×vector C, and vector X=0.2×vector A+0.8×vector C.

In this connection, in the camera 10 shown in FIG. 1, imparting of movements to the imaging lens 40 is performed by means of the CPU 12 imparting to the imaging lens 40 physical movements that are independent of each other in the horizontal direction and the vertical direction through the motor driver 41 for the imaging lens 40. Imparting of movements to the CCD 38 is performed by means of the CPU 12 imparting to the CCD 38 physical movements that are independent of each other in the horizontal direction and the vertical direction through the motor driver 39 for the CCD 38.

Further, after actually imaging a still image, the camera 10 of this embodiment can correct the still image that was actually imaged through control by the CPU 12 that is based mainly on motion of the subject and motion of the camera.

More specifically, blurring is corrected for the still image after imaging on the basis of the imaging situation (indicates whether the main subject or camera is moving or motionless) that was determined from motion vectors, the imaging method set in the camera 10 (indicates whether or not continuous imaging is being performed), and the motion vectors of the main subject and the camera. An example thereof is described hereunder.

When performing single image imaging in imaging situation B (camera is moving and main subject is motionless) as shown in FIG. 4, since there is an extremely high probability that the main subject will not move during exposure for the actual imaging, correction is not performed for the image that was imaged.

When performing single image imaging in imaging situation C (camera is motionless and main subject is moving) as shown in FIG. 5, since there is an extremely high probability that the main subject will move during exposure for the actual imaging, correction is performed for the imaged image on the basis of vector C (motion vector of main subject).

When performing continuous imaging in imaging situation D (camera and main subject are both moving) also, as shown in FIG. 6, since there is an extremely high probability that the main subject will move during exposure for the actual imaging, correction is performed for the imaged image on the basis of vector A (or vector C).

In this connection, when performing correction for an imaged image, which of the motion vectors is taken as a reference depends on whether the photographer places priority on the main subject and on the background. In general, when background blurring was prevented some blurring remains in the main subject, and when blurring of the main subject was corrected some blurring remains in the background.

It is also possible to assign weights to each motion vector to determine the correction amount. Specific examples of assigning weights include, when taking vector X as a reference vector to be the reference for correction, vector X=0.5×vector A+0.5×vector C, and vector X=0.2×vector A+0.8×vector C.

After correcting an actually imaged still image on the basis mainly of the motion vector of the camera and motion vector of the subject as described in the foregoing, it is possible to simultaneously display a plurality of correction images on the display panel 28 by control of the CPU 12.

Here, cases of simultaneously displaying a plurality of still images include a case of simultaneously displaying a still image before correction and a still image after correction, a case of displaying a plurality of still images after correction, and a case of displaying a still image before correction and a plurality of still images after correction.

Examples of a plurality of still images after correction include still images which were corrected by taking only vector A as a reference, still images which were corrected by taking only vector C as a reference, still images which were corrected by assigning weights to vector A and vector C, respectively, and still images which were corrected by taking into consideration a still image after imaging. For still images which were corrected by assigning weights to motion vectors, it is also possible to perform correction by changing a coefficient for the assignment of weights, and then display the images.

FIGS. 17 to 24 show various examples of simultaneously displaying a plurality of images.

Figure 17:
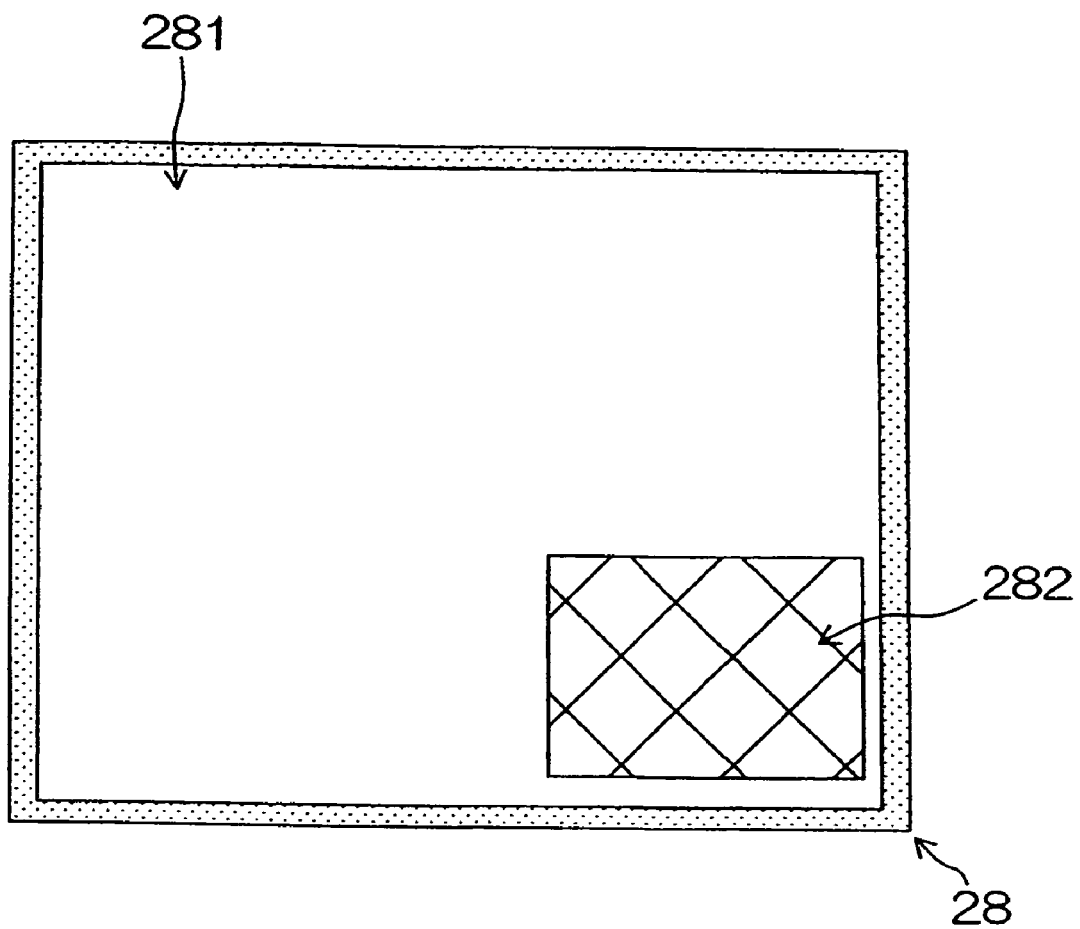
FIG. 17 is an explanatory drawing showing an example in which one still image before correction and one still image after correction are displayed in different sizes.
Figure 18:
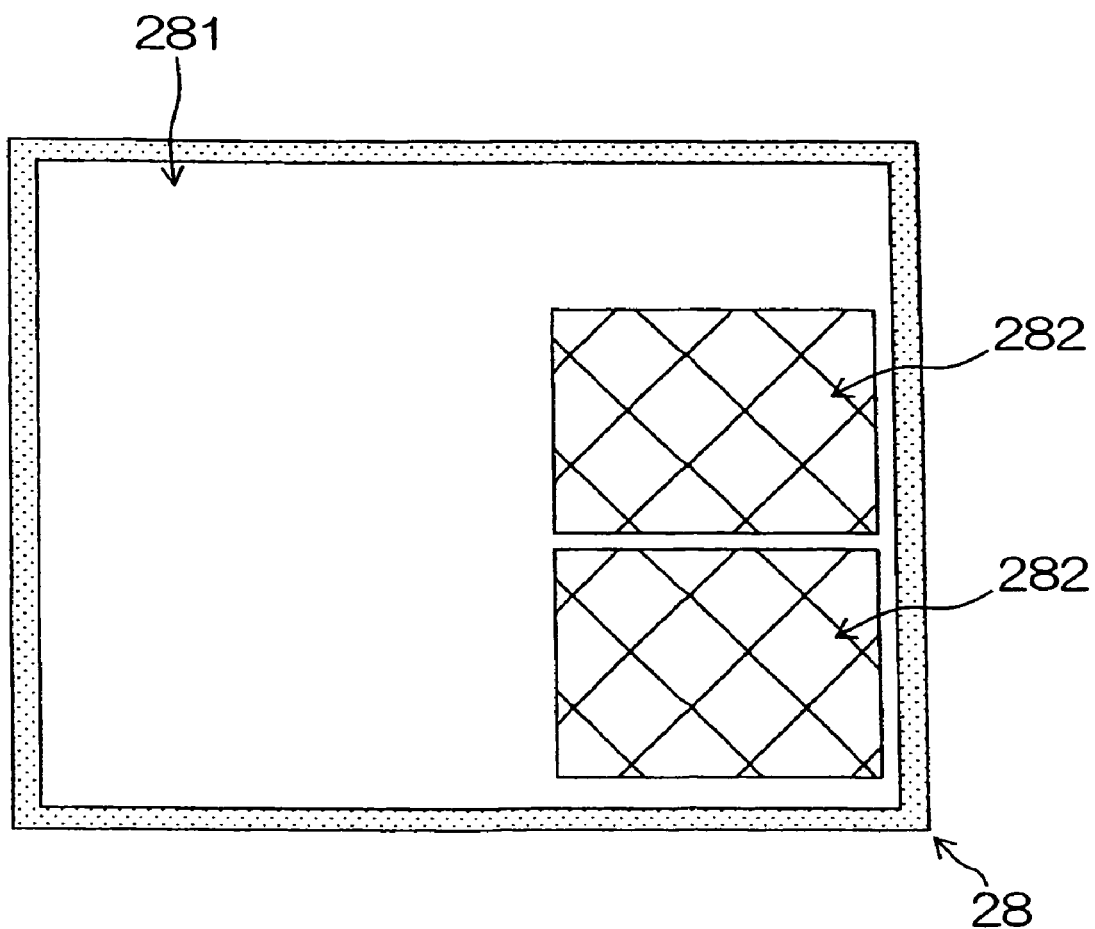
FIG. 18 is an explanatory drawing showing an example in which one still image before correction and two still images after correction are displayed in different sizes.
Figure 19:
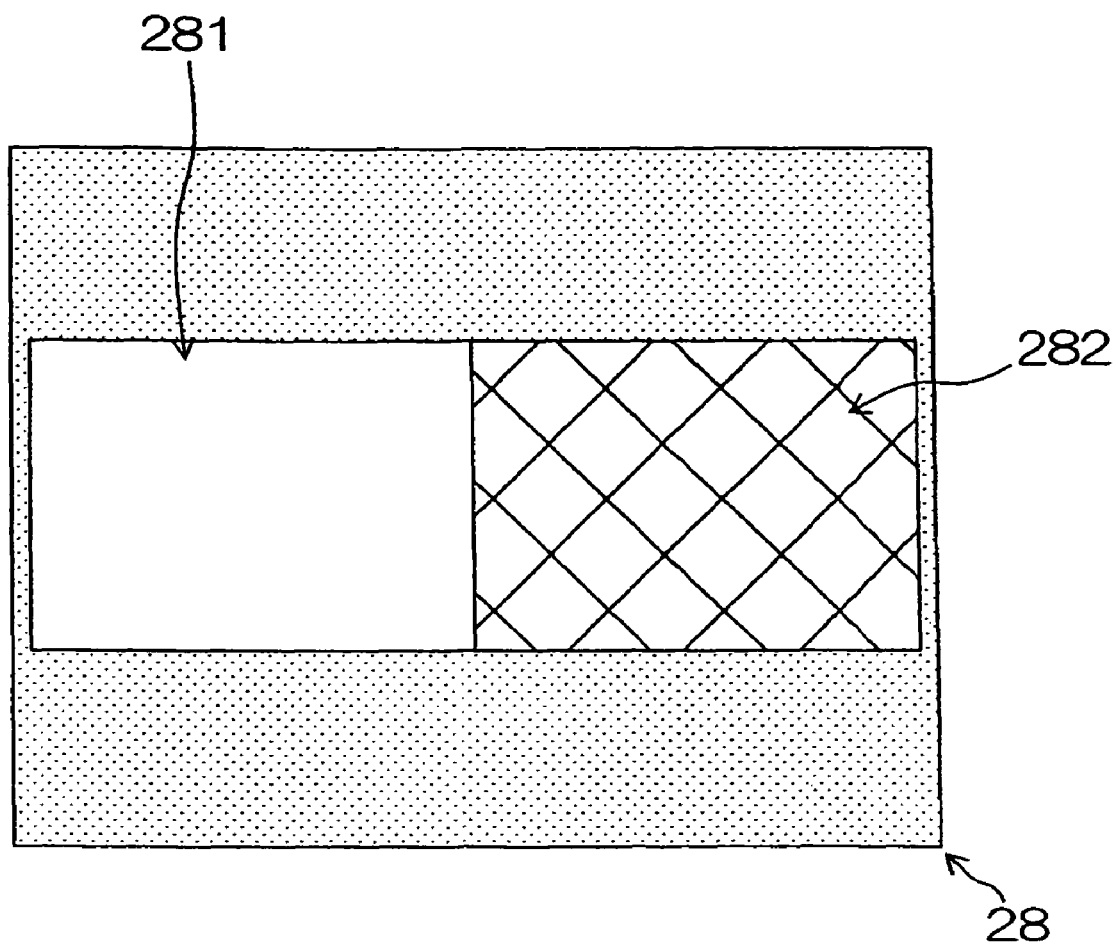
FIG. 19 is an explanatory drawing showing an example in which one still image before correction and one still image after correction are displayed in the same size.
Figure 20:
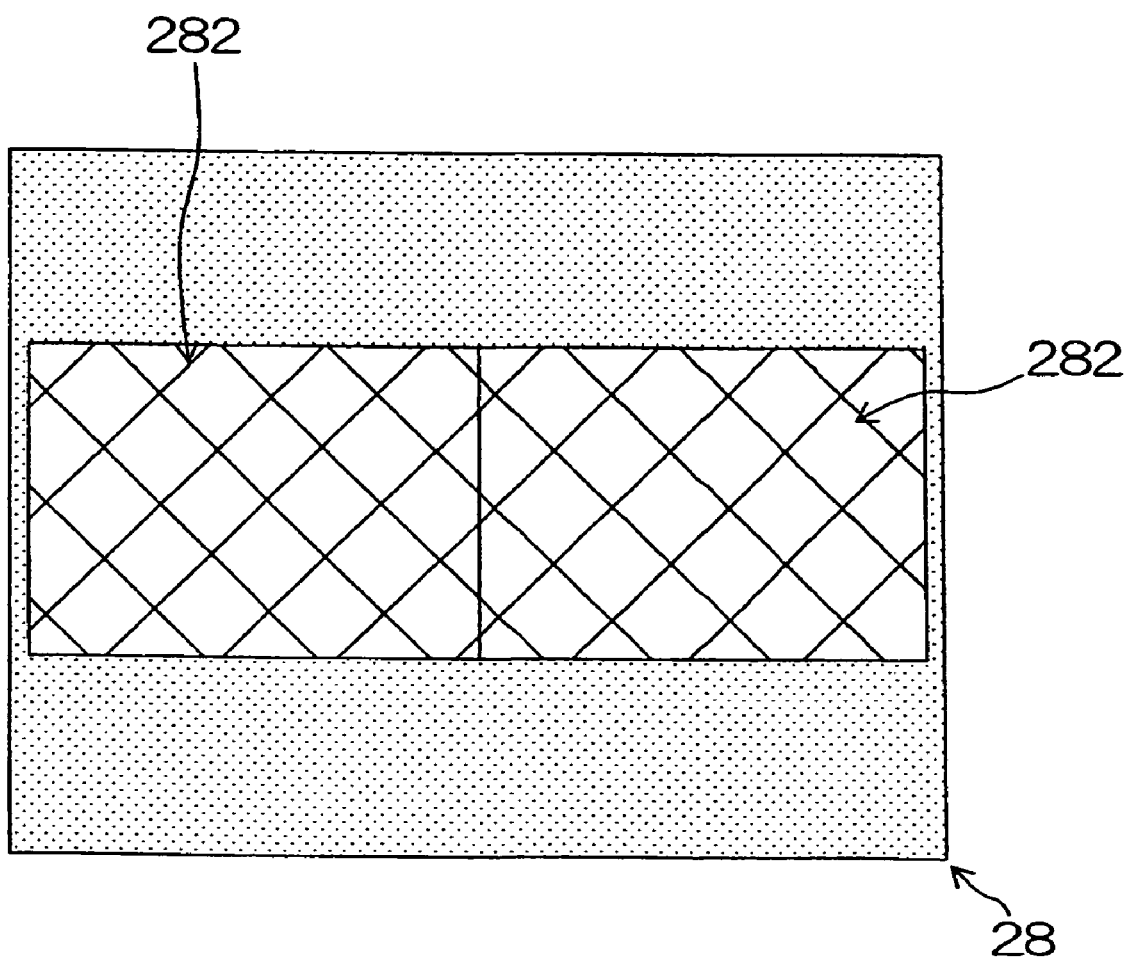
FIG. 20 is an explanatory drawing showing an example in which two still images after correction are displayed in the same size.
Figure 21:
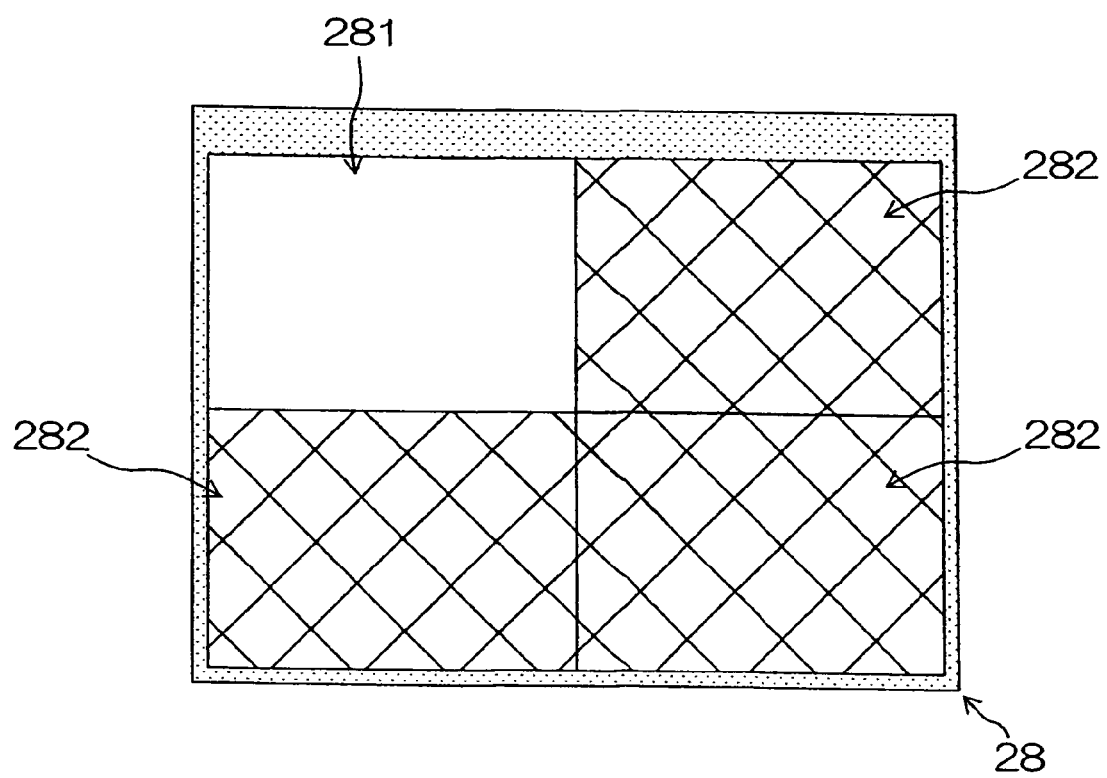
FIG. 21 is an explanatory drawing showing an example in which one still image before correction and three still images after correction are displayed in the same size.
Figure 22:
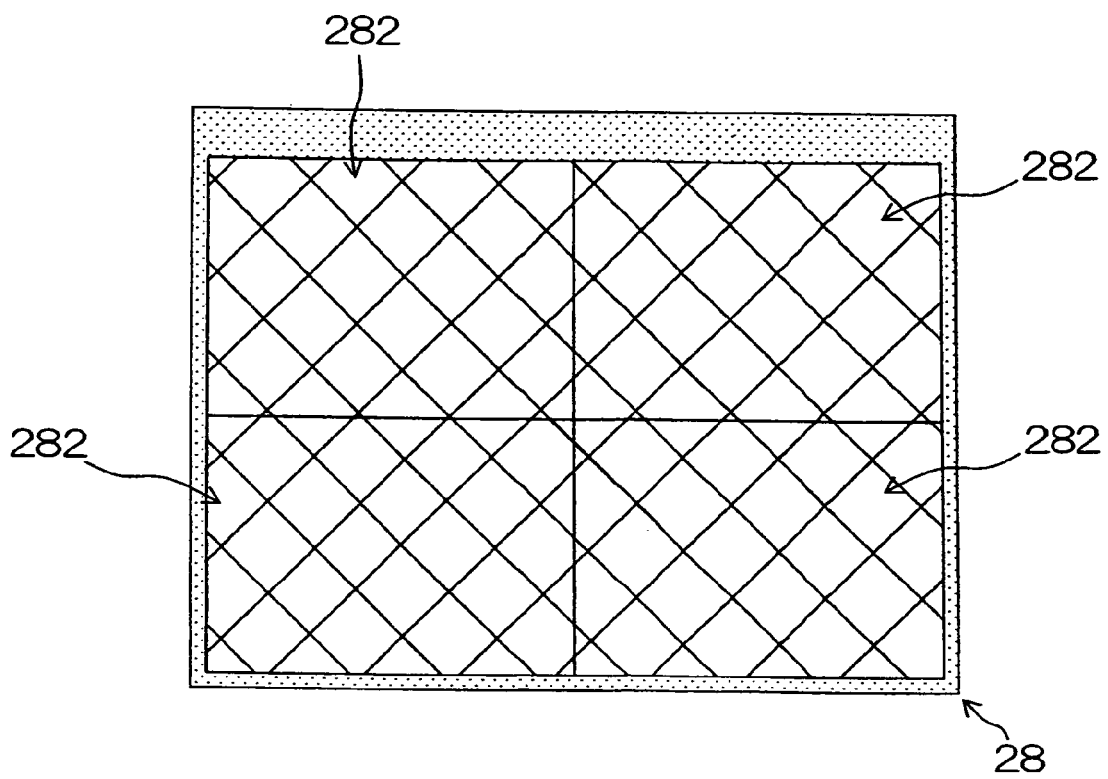
FIG. 22 is an explanatory drawing showing an example in which four still images after correction are displayed in the same size.

In FIGS. 17 and 18, a still image before correction 281 is displayed in a larger size than a still image after correction 282. A configuration may also be adopted in which, conversely, the still image after correction 282 is displayed in a larger size than the still image before correction 281.

In FIGS. 19 to 24, a plurality of still images 281 and 282 are displayed in a condition in which they do not overlap with each other.

Figure 23:
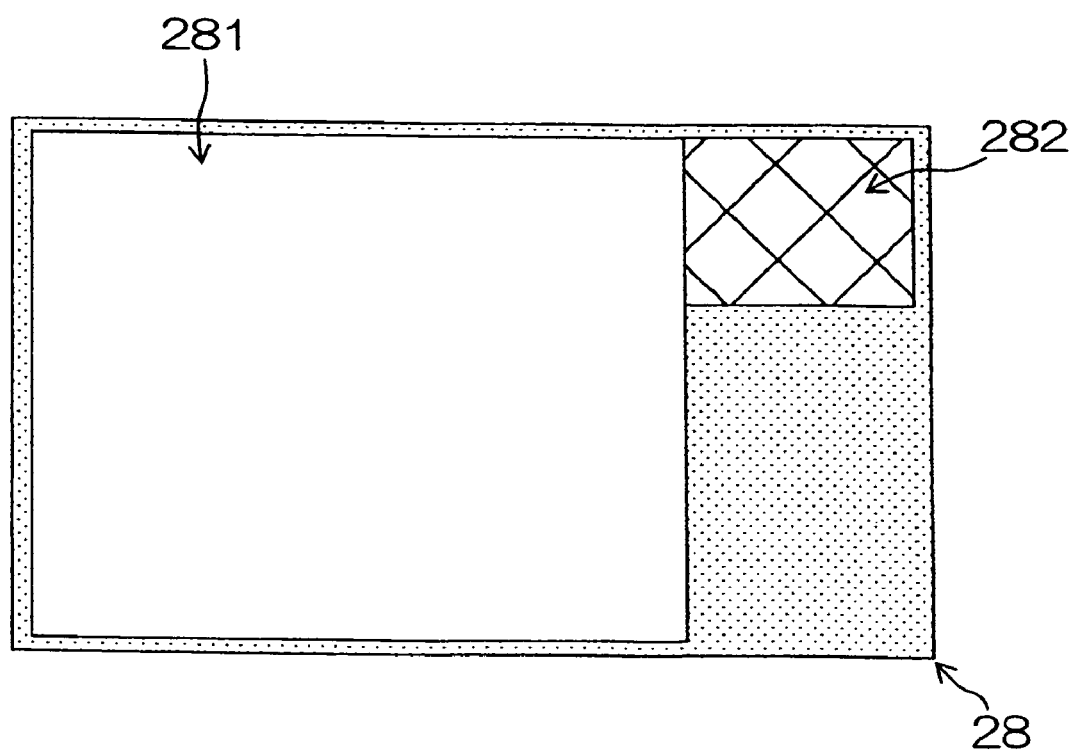
FIG. 23 is an explanatory drawing showing an example in which the size of the display panel was enlarged to display one still image before correction and one still image after correction.
Figure 24:
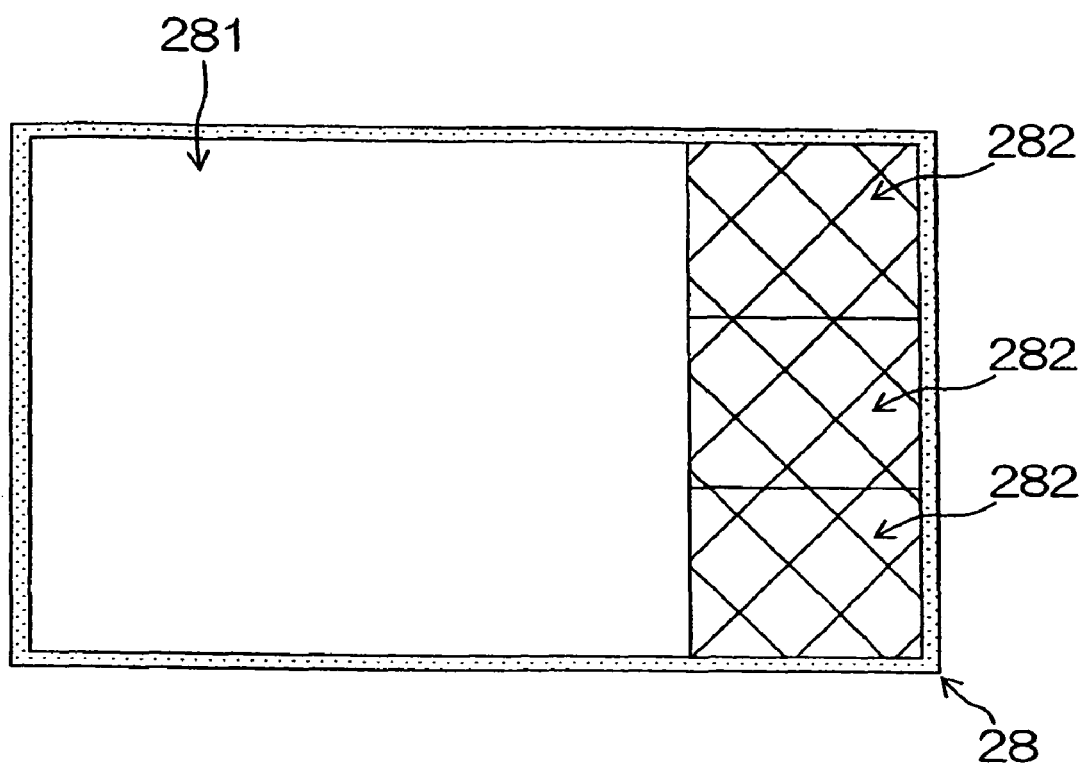
FIG. 24 is an explanatory drawing showing an example in which the size of the display panel was enlarged to display one still image before correction and three still images after correction.

In FIGS. 19, 20, 21 and 22, the ratio of the sizes of all of the still images to each other (that is, the size ratio of the still image before correction 281 to the still images after correction 282, and the size ratio of the still images after correction 282 to each other) is 1:1. In FIGS. 23 and 24, the size ratio of the still image before correction 281 to the still image after correction 282 is 9:1.

The screen size of the display panel 28 is also variable. For example, the screen size of the display panel 28 can be switched depending on whether or not to simultaneously display both a still image after correction and a still image before correction or depending on the number of still images after correction to be displayed at the same time. For example, the ratio of the size of the display panel 28 when displaying only a still image after correction to the size of the display panel 28 when displaying both a still image after correction and a still image before correction may be 3:4.

Switching the size of a still image or switching the size of the display panel 28 in this manner is performed by control of the CPU 12.

Further, when the photographer selected a required still image among a plurality of still images that were displayed on the display panel 28 by operating the key 24, the selected still image is recorded on the recording medium 32 by control of the CPU 12 through the media controller 34.

In this case, when a still image after correction and a still image before correction were both displayed on the display panel 28 as shown in FIGS. 17, 18, 19, 21, 23 and 24, a still image among these still images for which a selection instruction was input by means of the key 24 is recorded on the recording medium 32.

Further, when a plurality of still images after correction was displayed on the display panel 28 as shown in FIGS. 18, 20, 21, 22 and 24, a still image among these still images for which a selection instruction was input by means of the key 24 is recorded on the recording medium 32.

When a plurality of still images were selected by means of the key 24, the selected still images are associated with each other and recorded on the recording medium 32. For example, the plurality of still images are recorded as files in which one part of the file name is common among the plurality of still images.

In the case of continuous imaging, still images are recorded on the recording medium 32 without waiting for a selection instruction to be input by operation of the key 24. More specifically, as described above, although in single image imaging a selected still image is recorded on the recording medium 32 after waiting for a still image selection instruction to be input through operation of the key 24, in the case of continuous imaging both a still image before correction and a corrected still image are recorded on the recording medium 32 without waiting for a selection instruction to be input for a still image through operation of the key 24. That is, while in the case of single image imaging the photographer decides which still image to store (or which still image not to store), in the case of continuous imaging, switching is automatically performed through control by the CPU 12 to store both a still image before correction and a still image after correction. In this case, a configuration may be adopted in which a still image before correction is not recorded.

The overall processing flow of one embodiment of an imaging method that uses the above described camera 10 will be described using the flowchart of FIG. 25. This processing is executed by the CPU 12 is accordance with a predetermined program.

Figure 25:
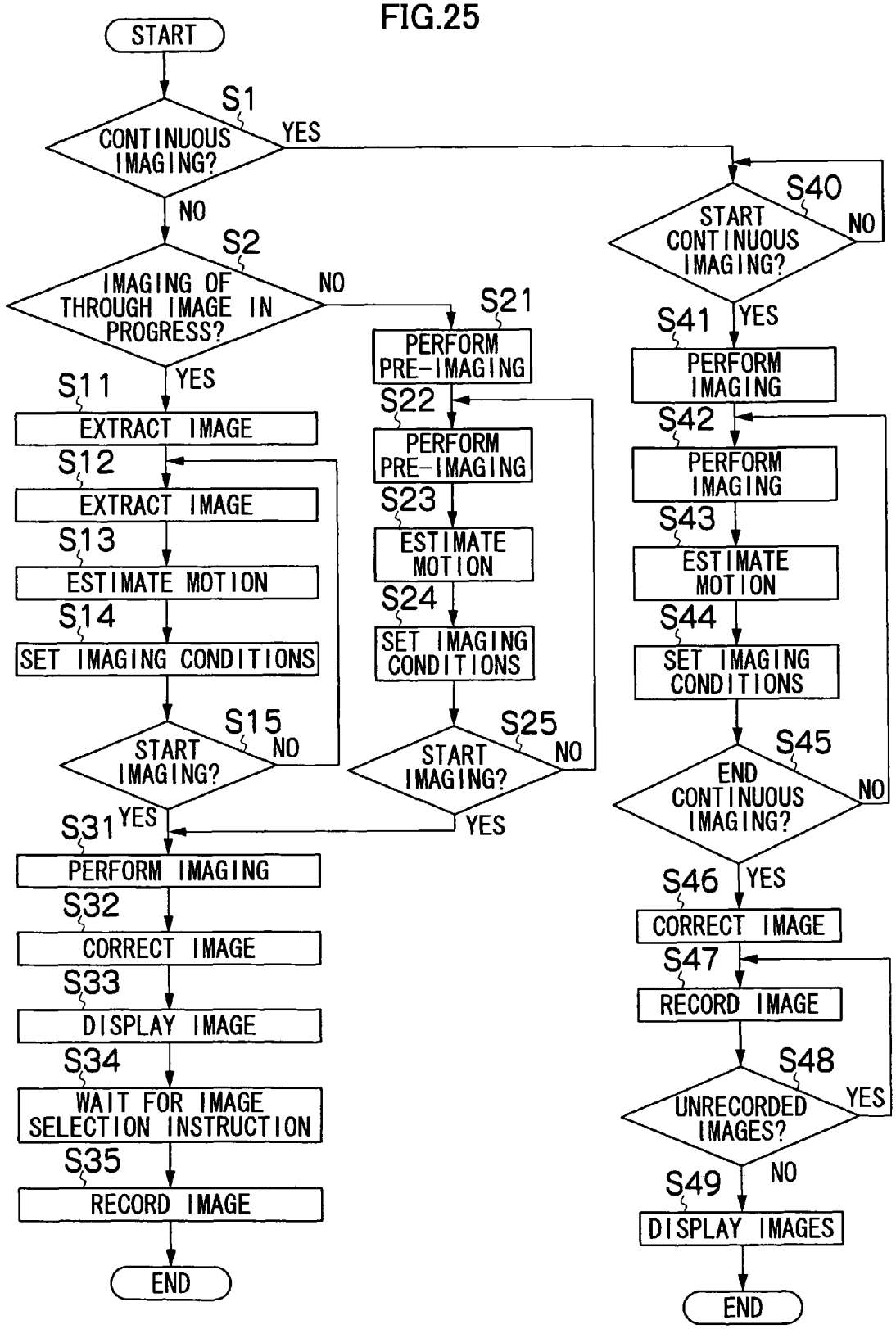
FIG. 25 is a flowchart showing the overall flow of one embodiment of the imaging method of the present invention.

In FIG. 25, first the CPU 12 determines whether or not continuous imaging is being performed (S1), and when continuous imaging is not being performed (i.e. when single image imaging is being performed) the CPU 12 determines if imaging of a through image is underway (S2).

When imaging of a through image is being conducted for single image imaging, still images are extracted from the through image at predetermined time intervals (S11, S12). The motion vector of the main subject and motion vector of the camera are then detected from two of the extracted still images to estimate the motion of the main subject and motion of the camera 10 (S13). Thereafter, imaging conditions such as the shutter speed, diaphragm, sensitivity and light emission conditions of the electronic flash 70 are set based on the thus-detected motion vector of the main subject and motion vector of the camera (S14). The CPU 12 then determines whether or not an instruction to start imaging was input (S15).

If an instruction to start imaging was not input, after a predetermined time has elapsed still images are again extracted from the through image (S12), and the motion vector of the main subject and motion vector of the camera are detected from n still images that were extracted (for example, two still images consisting of a still image extracted the current time and a still image extracted the previous time) to thereby estimate the motion of the main subject and the motion of the camera 10 (S13). The imaging conditions are then set based on the thus-detected motion vector of the main subject and motion vector of the camera (S14), and the CPU 12 determines whether or not an instruction to start imaging was input (S15).

When an instruction to start imaging is input, actual imaging of a still image is performed while carrying out blur prevention control which imparts a physical movement to the imaging lens 40 (or CCD 38) on the basis of the detected motion vector of the main subject and motion vector of the camera (S31).

In contrast, when imaging of a through image is not being conducted for single image imaging (i.e. when performing pre-imaging), pre-imaging is performed twice with a predetermined time interval (S21, S22). The motion vector of the main subject and motion vector of the camera are then detected from the two still images obtained by pre-imaging to estimate the motion of the main subject and motion of the camera 10 (S23). Thereafter, imaging conditions such as the shutter speed, diaphragm, sensitivity and light emission conditions of the electronic flash 70 are set based on the thus-detected motion vector of the main subject and motion vector of the camera (S24). The CPU 12 then determines whether or not an instruction to start imaging was input (S25). If an instruction to start imaging was not input, after a predetermined time has elapsed pre-imaging is performed again (S22), and the motion vector of the main subject and motion vector of the camera are detected from n still images that were obtained by the pre-imaging (for example, two still images consisting of a still image obtained by the current pre-imaging and a still image obtained by the previous pre-imaging) to thereby estimate the motion of the main subject and motion of the camera 10 (S23). The imaging conditions are then set based on the thus-detected motion vector of the main subject and motion vector of the camera (S24), and the CPU 12 determines whether or not an instruction to start imaging was input (S25).

When an instruction to start imaging is input, actual imaging of a still image is performed while carrying out blur prevention control which imparts a physical movement to the imaging lens 40 (or CCD 38) on the basis of the detected motion vector of the main subject and motion vector of the camera (S31).

When single image imaging (actual imaging) is performed along with through image imaging or pre-imaging in the manner described above, a still image that was actually imaged is corrected on the basis of the detected motion vector of the main subject and motion vector of the camera (S32). The still image after correction and still image before correction are then displayed (in some cases the still image before correction may not be displayed) on the display panel 28 (S33), after which the CPU 12 waits for the user to input a selection instruction by operating the key 24 (S34), and records a still image that was actually imaged on the recording medium 32 in accordance with the user's selection instruction (S35).

For continuous imaging, the CPU 12 determines whether an instruction to start continuous imaging was input (S40), and when an instruction to start continuous imaging was input the camera 10 performs imaging of still images of the subject at predetermined time intervals (S41, S42). When two still images of the subject were imaged, the motion vector of the main subject and motion vector of the camera are detected from the two still images that were imaged to thereby estimate the motion of the main subject and motion of the camera 10 (S43). Thereafter, imaging conditions such as the shutter speed, diaphragm, sensitivity and light emission conditions of the electronic flash 70 are set based on the fact that continuous imaging is being performed and on the thus-detected motion vector of the main subject and motion vector of the camera (S44). The CPU 12 then determines whether or not an instruction to end continuous imaging was input (S45).

When imaging third and subsequent still images of the subject, imaging of the still images is performed while carrying out blur prevention control which imparts a physical movement to the imaging lens 40 (or CCD 38) on the basis of the detected motion vector of the main subject and motion vector of the camera (S42). The motion vector of the main subject and motion vector of the camera are then detected from n still images that were imaged (for example, the still image obtained the immediately preceding time and the still image obtained the time before the immediately preceding time) to thereby estimate the motion of the main subject and motion of the camera 10 (S43). Thereafter, the imaging conditions are reset based on the fact that continuous imaging is being performed and on the thus-detected motion vector of the main subject and motion vector of the camera (S44), after which the CPU 12 determines whether or not an instruction to end continuous imaging was input (S45). In this manner, imaging of still images at predetermined time intervals (S42), estimation of the motion of the main subject and the camera 10 (S43), and setting of the imaging conditions (S44) are repeated until an instruction to end continuous imaging is input.

According to this configuration a plurality of still images that were obtained by continuous imaging are temporarily stored in the main memory 18, and still images are corrected based on the fact that continuous imaging is being performed and on the detected motion vector of the main subject and motion vector of the camera (S46). Further, both still images before correction and still images after correction are recorded on the recording medium 32 without waiting for the user to input a selection instruction for a still image (S47). The CPU 12 then determines whether or not unrecorded still images remain (S48), performs correction (S46) and recording (S47) for each of the plurality of still images that were imaged by continuous imaging, and displays a still image after correction and still image before correction (in some cases the still image before correction may not be displayed) or a representative still image on the display panel 28 (S49).

Although a case was explained for the aforementioned continuous imaging in which, since estimation of motion by detection of motion vectors (S43) is conducted after imaging the second still image, the setting of imaging conditions based on the motion vectors (S44), imaging with blur prevention control (S42), and image correction (S46) take effect from the third still image that was imaged, the present invention is not particularly limited to such a case.

More specifically, in a case in which a through image is being displayed prior to input of an instruction to start imaging for continuous imaging, a configuration may be adopted in which still images are extracted at predetermined time intervals from that through image to conduct detection of the motion vector of the main subject and motion vector of the camera prior to commencing the continuous imaging. In this case, blur prevention control and the setting of imaging conditions based on the motion vectors can also be performed with respect to the still images that were imaged in the first and second imaging. Further, image correction based on the motion vectors can also be performed with respect to the still images that were imaged in the first and second imaging.

In a case in which a through image is not being displayed prior to input of an instruction to start imaging for continuous imaging, a configuration may be adopted in which pre-imaging is performed at predetermined time intervals and detection of the motion vector of the main subject and motion vector of the camera is performed on the basis of a plurality of still images obtained by the pre-imaging. However, in order to prevent a good imaging opportunity being lost due to pre-imaging, a configuration is preferably adopted in which continuous imaging starts without performing pre-imaging when an instruction to start imaging is input.

Although an imaging method was described for FIG. 25 in which the CPU 12 determines whether or not continuous imaging is being performed and whether or not imaging of a through image is underway (S1, S2), and depending on the circumstances, motion vectors are detected based on either still images extracted from the through image, still images from pre-imaging, or still images during continuous imaging to thereby estimate the motion, there are cases in which a camera may be equipped with only one of these modes according to the type of camera. For example, the camera may be one which is configured to always image a through image and estimate the motion of the subject and the camera, one which is configured to always perform pre-imaging and estimate the motion of the subject and the camera, or one which is configured to only estimate the motion of the subject and the camera at the time of continuous imaging in which there are many opportunities to image a moving subject.

While the present invention has been described with respect to what is presently considered to be the preferred embodiments, it is to be understood that the invention is not limited to the disclosed embodiments. To the contrary, the invention is intended to cover various modifications and improvements included within the spirit and scope of the invention.

What is claimed is:

1. An imaging device, comprising:
an image pickup device which images a subject; and
a motion estimating device which estimates an actual motion of the subject and an actual motion of the imaging device based on a through image which includes the subject imaged by the image pickup device prior to the actual imaging of a still image of the subject by the image pickup device,
wherein the motion estimating device determines a subject region and a background region in the through image prior to the actual imaging, obtains a first motion vector indicating a motion in the subject region and a second motion vector indicating a motion in the background region, wherein the motion of the subject is a difference between the first motion vector and the second motion vector and the motion of the imagine device is the second motion vector.

2. The imaging device according to claim 1, wherein the motion estimating device determines a imaging situation from any one of a first imaging situation where both of the subject and the imaging device are motionless, a second imaging situation where the subject is motionless and the imaging device is moving, a third imaging situation where the subject is moving and the imaging device is motionless, or a fourth imaging situation where both the subject and the imaging device are moving.

3. The imaging device according to claim 1, wherein the image pickup device performs imaging of the through image prior to the actual imaging of the still image of the subject, and the motion estimating device estimates the motion of the subject and the motion of the imaging device based on a plurality of still images which were extracted at predetermined intervals from the through image.

4. The imaging device according to claim 1, wherein the image pickup device performs pre-imaging a plurality of times at predetermined intervals prior to actual imaging of the still image of the subject, and the motion estimating device estimates the motion of the subject and the motion of the imaging device based on a plurality of still images which were obtained by the pre-imaging.

5. The imaging device according to claim 1, wherein the image pickup device performs continuous imaging which images successive still images of the subject at predetermined intervals and, during continuous imaging, the motion estimating device estimates the motion of the subject and the motion of the imaging device at the time of the next imaging of a still image on the basis of a plurality of still images which were already imaged.

6. The imaging device according to claim 1, further comprising an imaging conditions setting device which sets shutter speed, diaphragm, sensitivity, light emission conditions and other imaging conditions based on the motion of the subject and the motion of the imaging device which were estimated by the motion estimating device.

7. The imaging device according to claim 2, further comprising an imaging conditions setting device which sets shutter speed, diaphragm, sensitivity, light emission conditions and other imaging conditions based on the imaging situation determined by the motion estimating device and on whether it is a continuous imaging.

8. The imaging device according to claim 6 or 7, wherein the imaging conditions setting device sets the imaging conditions after assigning weights to a motion vector of the subject and a motion vector of the imaging device, respectively.

9. The imaging device according to claim 1, further comprising a blur prevention control device which imparts a physical movement to the image pickup device so as to prevent a blur from occurring in the still image that is actually imaged, based on the motion of the subject and the motion of the imaging device which were estimated by the motion estimating device.

10. The imaging device according to claim 2, comprising a blur prevention control device which imparts a physical movement to the image pickup device so as to prevent a blur from occurring in the still image upon actual imaging, based on the imaging situation determined by the motion estimating device and on whether it is a continuous imaging.

11. The imaging device according to claim 9 or 10, wherein the blur prevention control device imparts a physical movement to the image pickup device after assigning weights to a motion vector of the subject and a motion vector of the imaging device, respectively.

12. The imaging device according to claim 1, further comprising an image correction device which corrects the still image that was actually imaged by the image pickup device, based on the motion of the subject and the motion of the imaging device.

13. The imaging device according to claim 2, further comprising an image correction device which corrects the still image that was actually imaged by the image pickup device, based upon actual imaging in the imaging situation determined by the motion estimating device and on whether it is a continuous imaging.

14. The imaging device according to claim 12 or 13, wherein the image correction device corrects the still image that was actually imaged after assigning weights to a motion vector of the subject and a motion vector of the imaging device, respectively.

15. The imaging device according to claim 12, further comprising a display device that is capable of displaying one or a plurality of still images that were corrected by the image correction device and also displaying a still image in a state before it was corrected by the image correction device.

16. The imaging device according to claim 15, wherein a ratio of the sizes of the still image after correction and the still image before correction, or a ratio of the sizes of two or more of the still images after correction is variable.

17. The imaging device according to claim 15, wherein the screen size of the display device can be changed according to whether or not to display both the still image after correction and the still image before correction simultaneously, or according to the number of the still images after correction that are displayed simultaneously.

18. The imaging device according to claim 15, further comprising an instruction input device which inputs a selection instruction that specifies a still image to be recorded on a predetermined recording medium from among the still image after correction and the still image before correction, or a selection instruction that specifies a still image to be recorded on the recording medium from among a plurality of the still images after correction; and an image recording control device that records a still image that was selected in accordance with the selection instruction.

19. The imaging device according to claim 18, wherein, when a plurality of still images was selected by the instruction input device, the image recording control device associates the selected still images with one another before conducting the recording.

20. The imaging device according to claim 18, wherein, in a case of continuous imaging the image recording control device records both the still image before correction and the still image after correction without waiting for input of the selection instruction, while in a case of single image imaging the image recording control device waits for input of the selection instruction before conducting the recording.

21. An imaging method that uses an imaging device which images a subject, comprising:
    estimating an actual motion of the subject and an actual motion of the imaging device based on a through image which includes the subject imaged by the imaging device, and then performing an actual imaging of a still image of the subject and,
    determining a subject region and a background region in the image prior to the actual imaging, obtaining a first motion vector indicating a motion in the subject region and a second motion vector indicating a motion in the background region, wherein the motion of the subject is a difference between the first motion vector and the second motion vector and the motion of the imaging device is the second motion vector.

* * * * *